(12) United States Patent
Filippov et al.

(10) Patent No.: US 11,750,837 B2
(45) Date of Patent: Sep. 5, 2023

(54) METHOD AND APPARATUS FOR INTRA PREDICTION USING AN INTERPOLATION FILTER

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/223,758

(22) Filed: Apr. 6, 2021

(65) Prior Publication Data

US 2021/0258608 A1 Aug. 19, 2021

Related U.S. Application Data

(63) Continuation of application No. PCT/RU2019/050178, filed on Oct. 7, 2019.
(Continued)

(51) Int. Cl.
*H04N 19/59* (2014.01)
*H04N 19/105* (2014.01)
(Continued)

(52) U.S. Cl.
CPC ........... *H04N 19/59* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

| 9,451,254 B2 * | 9/2016 | Joshi | H04N 19/70 |
| 2008/0123974 A1 * | 5/2008 | Zhu | H04N 19/61 |
| | | | 382/234 |

(Continued)

FOREIGN PATENT DOCUMENTS

| CN | 108605124 A | 9/2018 |
| KR | 20170116850 A | 10/2017 |

OTHER PUBLICATIONS

Fabien Racape et al, CE3-related: Wide-angle intra prediction for non-square blocks, JVET-K0500-r3, Joint Video Experts Team (JVET) of ITU-T SG 16 WP 3 and ISO/IEC JTC 1/SC 29/WG11, 11th Meeting: Ljubljana, SI, 10 Jul. 18, 2018, 12 pages.

(Continued)

*Primary Examiner* — Chikaodili E Anyikire
*Assistant Examiner* — Shanika M Brumfield
(74) *Attorney, Agent, or Firm* — HUAWEI TECHNOLOGIES CO., LTD.

(57) ABSTRACT

Provided are a method, an apparatus, a computer program product and a non-transitory computer-readable medium for video coding. The method comprises performing an intra-prediction process of a block comprising samples to be predicted, wherein an interpolation filter is applied to reference samples of the block during the intra-prediction process of the block. The interpolation filter is selected on the basis of a subpixel offset between the reference samples and the samples to be predicted, and a size of a main reference side used in the intra-prediction process is determined according to a length of the interpolation filter and an intra-prediction mode that provides, out of a set of available intra-prediction modes, the greatest non-integer value of said subpixel offset, wherein the main reference side comprises the reference samples.

20 Claims, 31 Drawing Sheets

Related U.S. Application Data

(60) Provisional application No. 62/742,300, filed on Oct. 6, 2018, provisional application No. 62/744,096, filed on Oct. 10, 2018, provisional application No. 62/757,150, filed on Nov. 7, 2018, provisional application No. 62/753,055, filed on Oct. 30, 2018.

(51) Int. Cl.
  *H04N 19/117* (2014.01)
  *H04N 19/159* (2014.01)
  *H04N 19/176* (2014.01)
  *H04N 19/593* (2014.01)

(52) U.S. Cl.
  CPC ......... *H04N 19/159* (2014.11); *H04N 19/176* (2014.11); *H04N 19/593* (2014.11)

(56) References Cited

U.S. PATENT DOCUMENTS

| | | | | |
|---|---|---|---|---|
| 2012/0163460 | A1* | 6/2012 | Chien | H04N 19/523 375/E7.113 |
| 2012/0170650 | A1* | 7/2012 | Chong | H04N 19/117 375/E7.243 |
| 2012/0243611 | A1 | 9/2012 | Kondo | |
| 2012/0288004 | A1* | 11/2012 | Sato | H04N 19/52 375/E7.243 |
| 2013/0188702 | A1* | 7/2013 | Li | H04N 19/593 375/240.12 |
| 2014/0233646 | A1* | 8/2014 | Matsuo | H04N 19/59 375/240.13 |
| 2015/0023405 | A1* | 1/2015 | Joshi | H04N 19/117 375/240.02 |
| 2015/0189314 | A1 | 7/2015 | Alshina et al. | |
| 2015/0237358 | A1 | 8/2015 | Alshin et al. | |
| 2016/0373743 | A1 | 12/2016 | Zhao et al. | |
| 2018/0020218 | A1* | 1/2018 | Zhao | H04N 19/61 |
| 2018/0091825 | A1 | 3/2018 | Zhao et al. | |
| 2020/0014922 | A1* | 1/2020 | Ramasubramanian | H04N 19/91 |
| 2020/0213590 | A1* | 7/2020 | Kim | H04N 19/18 |
| 2022/0053213 | A1* | 2/2022 | Yoo | H04N 19/11 |

OTHER PUBLICATIONS

Alexey Filippov et al, CE3: A combination of tests 3.1.2 and 3.1.4 for intra reference sample interpolation filter, JVET-L0xxx-v1, Joint Video Experts Team (JVET) of ITU-T SG 16 WP 3 and ISO/IEC JTC 1/SC 29/WG11, 12th Meeting: Macao, MO, 03 Oct. 12, 2018, 5 pages.

Sunmi Yoo et al, CE3 Related : Extended reference sample c omtruction for longer interpolation filter in intra prediction, JVET-L0291-v3, Joint Video Experts Team (JVET) of ITU-T SG 16 WP 3 and ISO/IEC JTC 1/SC 29/WG11, 12th Meeting: Macao, CN, Oct. 3-12, 2018, 6 pages.

Benjamin Bross et al, CE3: Multiple reference line intra prediction (Test 1.1.1, 1.1.2 1.1.3 and 1.1.4), JVET-L0283-v2, Joint Video Experts Team (JVET) of ITU-T SG 16 WP 3 and ISO/IEC JTC 1/SC 29/WG11, 12th Meeting: Macao, CN, 3 Oct. 12, 2018, 7 pages.

ITU-T H.261 (Mar. 1993), Line Transmission of Non-Telephone Signals, Video Codec for Audiovisual Services AT px64 kbits, total 29 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Document: JVET-L0324-v2, Geert Van der Auwera et al, CE3: Intra reference sample interpolation filter selection using MDIS conditions (Test 3.1.2), Joint Video Experts Team (JVET) of ITU-T SG 16 WP 3 and ISO/IEC JTC 1/SC 29/WG11, 12th Meeting: Macau, CN, Oct. 3-12, 2018, 16 pages.

Document: JVET-L0628-v1, Alexey Filippov et al, CE3: A combination of tests 3.1.2 and 3.1.4 for intra reference sample interpolation filter, Joint Video Experts Team (JVET) of ITU-T SG 16 WP 3 and ISO/IEC JTC 1/SC 29/WG 11, 12th Meeting: Macao, MO, Oct. 3-12, 2018, total 5 pages.

Pan Zhi-hong et al, A Intra Prediction Mode Algorithm based on AVS, 2010, 3 pages.

* cited by examiner

METHOD AND APPARATUS FOR INTRA PREDICTION USING AN INTERPOLATION FILTER

CROSS REFERENCE TO RELATED APPLICATIONS

This patent application is a continuation of International Application No. PCT/RU2019/050178, filed on Oct. 7, 2019, which claims the benefit of priority to U.S. Provisional Patent Application No. 62/742,300, filed Oct. 6, 2018 and U.S. Provisional Patent Application No. 62/744,096, filed Oct. 10, 2018 and U.S. Provisional Patent Application No. 62/753,055, filed Oct. 30, 2018 and U.S. Provisional Patent Application No. 62/757,150, filed Nov. 7, 2018. The aforementioned patent applications are hereby incorporated by reference in their entireties.

TECHNICAL FIELD

The present disclosure relates to the technical field of image and/or video coding and decoding, and in particular to method and apparatus of directional intra prediction with reference sample processing harmonized with the length of an interpolation filter.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes.

The intra mode coding scheme currently described in BMS is considered complex and a disadvantage of non-selected mode set is that the index list is always constant and not adaptive based on the current block properties (for e.g. its neighboring blocks INTRA modes).

SUMMARY

Embodiments of the present application providing apparatuses and methods for intra prediction are disclosed. The apparatus and method use a mapping process to simplify the calculation procedure for intra prediction, so as to improve coding efficiency. The scope of protection is defined by the claims.

The foregoing and other objects are achieved by the subject matter of the independent claims.

Further implementation forms are apparent from the dependent claims, the description and the figures.

Particular embodiments are outlined in the attached independent claims, with other embodiments in the dependent claims.

According to a first aspect the present disclosure relates to a method of video coding. The method is performed by an encoding or a decoding apparatus. The method includes:

performing an intra-prediction process of a block, such as a block comprising samples to be predicted or a block of predicted samples, particularly such as a luma block comprising luma samples to be predicted, wherein a subpixel interpolation filter is applied to reference samples (e.g. luminance reference samples) during the intra-prediction process of the block or a subpixel interpolation filter is applied to reference samples (e.g. chrominance reference samples) during the intra-prediction process of the block;

wherein the subpixel interpolation filter is selected on the basis of the subpixel offset, e.g. subpixel offset between reference samples' positions and interpolated samples' positions or between the reference samples and the samples to be predicted; and wherein a size of the main reference side used in the intra-prediction process is determined according to the length of the subpixel interpolation filter and the intra-prediction mode (e.g. an intra-prediction mode out of a set of available intra-prediction modes) that provides the greatest value (e.g. the greatest non-integer value) of said subpixel offset, wherein the main reference side comprises the reference samples.

Reference samples are samples based on which a prediction (here in particular an intra-prediction) is performed. In other words, reference samples are samples outside a (current) block used to predict the samples of the (current) block. The term "current block" denotes a subject block for which a processing including the prediction is performed. For example, reference samples are samples adjacent to the block at one or more of the block sides. In other words, reference samples used to predict the current block may be included in a line of samples at least partially adjacent to one or more block boundaries (sides) and parallel with the one or more block boundaries (sides).

Reference samples may be samples at integer sample positions or interpolated samples at subsample positions, e.g. non-integer positions. Integer sample positions may refer to actual sample positions in the image to be coded (encoded or decoded).

Reference side is a side of the block from which the reference samples are used to predict the samples of the block. Main reference side is the side of the block from which the reference samples are taken (in some embodiments there is only one side from which reference samples are taken). However, in general, main reference side may refer to the side from which the reference samples are mainly taken (e.g. from which most of the reference samples are taken, or from which reference samples for predicting most of the block samples are taken, or the like). The main reference side includes reference samples, which are used to predict samples of the block. It may be beneficial for memory saving purposes, if the main reference side consists of the reference samples used to predict samples of the block and if all those reference samples used to predict samples of the block are included in the main reference side. However, the present disclosure is generally applicable also with main reference side including the reference samples used to predict the block. These may comprise the reference samples directly used for prediction as well as reference samples used for filtering to obtain sub-samples used then to the prediction of the block samples.

In general, the reference samples of the current block comprise neighboring reconstructed samples of the current block. Such as, if the current block is a current chroma block, the chroma reference samples of the current chroma block comprises neighboring reconstructed samples of the current chroma block. Such as, if the current block is a current luma block, the luma reference samples of the current luma block comprise neighboring reconstructed samples of the current luma block.

It is understood that memory requirements are determined by the greatest value of the subpixel offset. Accordingly, by determining a size of the main reference side in accordance with the present disclosure, the disclosure facilitates providing memory efficiency in video coding using intra-prediction. In other words, by determining a size of the main reference side used in the intra-prediction process according to the above mentioned first aspect, memory requirements may be reduced while providing (storing) reference samples for predicting a block. This in turn, may lead to a more efficient implementation of intra-prediction for image/video encoding and decoding.

In a possible implementation form of the method according to the first aspect as such, the interpolation filter is selected on the basis of the subpixel offset between reference samples' positions and predicted samples' positions.

It is understood that predicted samples are interpolated samples in that they are based on an output of an interpolation process.

In a possible implementation form of the method according to the first aspect as such, the subpixel offset is determined based on a reference line (such as refIdx); or the subpixel offset is determined based on an intraPredAngle that depends on the intra prediction mode selected; or the subpixel offset is determined based on the distance between the reference samples (such as a reference line) and a side of the block of predicted samples, or from the reference samples (such as a reference line) to a side of the block of predicted samples.

In a possible implementation form of the method according to the first aspect as such, the greatest value of said subpixel offset is the greatest non-integer subpixel offset (such as a greatest fractional subpixel offset or a greatest non-integer value of said subpixel offset), and the size of the main reference side is selected to be equal to a sum of an integer part of the greatest non-integer subpixel offset, a size of a side of the block of predicted samples, and a portion or a whole of the length of the interpolation filter (such as a half of the length of the interpolation filter).

One of the advantages of such selection of the size of the main reference side is provision (storing/buffering) of all samples necessary for the intra-prediction of the block and reducing of number of (stored/buffered) samples which are not used for predicting the (samples of the) block.

In a possible implementation form of the method according to the first aspect as such, the side of the block of predicted samples is a width of the block of predicted samples if the intra prediction mode is greater than a vertical intra prediction mode (VER_IDX);

or the side of the block of predicted samples is a height of the block of predicted samples if the intra prediction mode is lesser than a horizontal intra prediction mode (HOR_IDX).

For example, At FIG. 10, VER_IDX corresponds to a vertical intra prediction mode #50, HOR_IDX corresponds to a horizontal intra prediction mode #18.

In a possible implementation form of the method according to the first aspect as such, reference samples of the main reference side with positions greater than the doubled size of the said block side are set to be equal to a sample located at the doubled size of the said size.

In other words, it padding to the right by replicating pixels that fall beyond the doubled side length. Memory buffer sizes are preferred to be a power of two and it is better to use the last sample (i.e. located at the doubled size of the said size) of the power-of-two sized buffer than to maintain a non-power-of-two sized buffer.

In a possible implementation form of the method according to the first aspect as such, wherein the size of the main reference side is determined as a sum of:

a block main side length, a portion or a whole of the length of the interpolation filter (such as the length of the interpolation filter, or a half of the length of the interpolation filter) minus one a maximum of the following two values M:

the block main side length an integer part of the maximum (or greatest) non-integer subpixel offset plus a portion or a whole of the length of the interpolation filter (such as a half of the length of the interpolation filter), or the integer part of the maximum (or greatest) non-integer subpixel offset plus a portion or a whole of the length of the interpolation filter (such as a half of the length of the interpolation filter) plus one.

One of the advantages of such selection of the size of the main reference side is provision (storing/buffering) of all samples necessary for the intra-prediction of the block and reducing or even avoiding provision (storing/buffering) of samples which are not used for predicting the (samples of the) block.

It is noted that "block main side", "Block side length", "the block main side length" and "a size of a side of the block of predicted samples" are the same concepts throughout the present disclosure.

In a possible implementation form of the method according to the first aspect as such, when the maximum of two values M is equal to the block main side length, right-padding is not performed; or when the maximum of two values M is equal to the integer part of the maximum non-integer subpixel offset plus the half of the length of the interpolation filter or to the integer part of the greatest non-integer value of the subpixel offset plus a half of the length of the interpolation filter plus one, right-padding is performed.

In a possible implementation, a padding is performed by replicating first and/or last reference samples of the main reference side to the left and/or to the right side respectively, in particular as follows: denoting the main reference side as ref, and the size of the main reference side as refS, the padding is represented as: ref[−1]=p[0], and/or ref[refS+1]=p[refS], wherein ref[−1] represents a value of the left to the main reference side, p[0] represents a value of the first reference sample of the main reference side, ref[refS+1] represents a value of the right to the main reference side, and p[refS] represents a value of the last reference sample of the main reference side.

In other words, right-padding may be performed by ref[refS+1]=p[refS]. In addition or alternatively, left-padding may be performed by ref[−1]=p[0].

In this way, the padding may facilitate provision of all samples necessary for the prediction also taking into account interpolation filtering.

In a possible implementation form of the method according to the first aspect as such, filters used in intra-prediction processes are finite impulse response filters and their coefficients are fetched from a look-up table.

In a possible implementation form of the method according to the first aspect as such, the interpolation filter used in intra-prediction process is a 4 tap filter.

In a possible implementation form of the method according to the first aspect as such, the coefficients of the interpolation filter depend on the subpixel offset, such as the non-integer-part of the subpixel offset, as follows:

| Subpixel offset (non-integer part) | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 sub-pixel resolution. In other words, the interpolation filter (such as subpixel interpolation filter) is represented by coefficients in the above table.

In a possible implementation form of the method according to the first aspect as such, the coefficients of the interpolation filter depend on the subpixel offset, such as the non-integer-part of the subpixel offset, as follows:

| Subpixel offset (non-integer part) | $c_0$ | $c_1$ | $c_2$ | $c_3$ |
|---|---|---|---|---|
| 0 (integer) | 16 | 32 | 16 | 0 |
| 1 | 15 | 29 | 17 | 3 |
| 2 | 15 | 29 | 17 | 3 |
| 3 | 14 | 29 | 18 | 3 |
| 4 | 13 | 29 | 18 | 4 |
| 5 | 13 | 28 | 19 | 4 |
| 6 | 13 | 28 | 19 | 4 |
| 7 | 12 | 28 | 20 | 4 |
| 8 | 11 | 28 | 20 | 5 |
| 9 | 11 | 27 | 21 | 5 |
| 10 | 10 | 27 | 22 | 5 |
| 11 | 9 | 27 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 8 | 24 | 24 | 8 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 27 | 9 |
| 22 | 5 | 22 | 27 | 10 |
| 23 | 5 | 21 | 27 | 11 |
| 24 | 5 | 20 | 28 | 11 |
| 25 | 4 | 20 | 28 | 12 |
| 26 | 4 | 19 | 28 | 13 |
| 27 | 4 | 19 | 28 | 13 |

| Subpixel offset (non-integer part) | $c_0$ | $c_1$ | $c_2$ | $c_3$ |
|---|---|---|---|---|
| 28 | 4 | 18 | 29 | 13 |
| 29 | 3 | 18 | 29 | 14 |
| 30 | 3 | 17 | 29 | 15 |
| 31 | 3 | 17 | 29 | 15 | wherein "Subpixel offset" column is defined in 1/32 subpixel resolution. In other words, the interpolation filter (such as subpixel interpolation filter) is represented by coefficients in the above table.

In a possible implementation form of the method according to the first aspect as such, the coefficients of the interpolation filter depend on the subpixel, such as the non-integer-part of the subpixel offset, offset as follows:

| Subpixel offset (non-integer part) | $c_0$ | $c_1$ | $c_2$ | $c_3$ |
|---|---|---|---|---|
| 0 (integer) | 16 | 32 | 16 | 0 |
| 1 | 15 | 29 | 17 | 3 |
| 2 | 15 | 29 | 17 | 3 |
| 3 | 14 | 29 | 18 | 3 |
| 4 | 13 | 29 | 18 | 4 |
| 5 | 13 | 28 | 19 | 4 |
| 6 | 13 | 28 | 19 | 4 |
| 7 | 12 | 28 | 20 | 4 |
| 8 | 11 | 28 | 20 | 5 |
| 9 | 11 | 27 | 21 | 5 |
| 10 | 10 | 27 | 22 | 5 |
| 11 | 9 | 27 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 8 | 24 | 24 | 8 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 27 | 9 |
| 22 | 5 | 22 | 27 | 10 |
| 23 | 5 | 21 | 27 | 11 |
| 24 | 5 | 20 | 28 | 11 |
| 25 | 4 | 20 | 28 | 12 |
| 26 | 4 | 19 | 28 | 13 |
| 27 | 4 | 19 | 28 | 13 |
| 28 | 4 | 18 | 29 | 13 |
| 29 | 3 | 18 | 29 | 14 |
| 30 | 3 | 17 | 29 | 15 |
| 31 | 3 | 17 | 29 | 15 | wherein "Subpixel offset" column is defined in 1/32 subpixel resolution. In other words, the interpolation filter (such as subpixel interpolation filter) is represented by coefficients in the above table.

In a possible implementation form of the method according to the first aspect as such, the coefficients of the interpolation filter depend on the subpixel offset, such as the non-integer-part of the subpixel offset, as follows:

| Subpixel offset (non-integer part) | $c_0$ | $c_1$ | $c_2$ | $c_3$ |
|---|---|---|---|---|
| 0 (integer) | 16 | 32 | 16 | 0 |
| 1 | 15 | 29 | 17 | 3 |
| 2 | 14 | 29 | 18 | 3 |
| 3 | 14 | 29 | 18 | 3 |
| 4 | 14 | 28 | 18 | 4 |
| 5 | 13 | 28 | 19 | 4 |
| 6 | 12 | 28 | 20 | 4 |
| 7 | 12 | 27 | 20 | 5 |
| 8 | 11 | 27 | 21 | 5 |
| 9 | 11 | 27 | 21 | 5 |
| 10 | 10 | 26 | 22 | 6 |
| 11 | 10 | 26 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 7 | 25 | 25 | 7 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 26 | 10 |
| 22 | 6 | 22 | 26 | 10 |
| 23 | 5 | 21 | 27 | 11 |
| 24 | 5 | 21 | 27 | 11 |
| 25 | 5 | 20 | 27 | 12 |
| 26 | 4 | 20 | 28 | 12 |
| 27 | 4 | 19 | 28 | 13 |
| 28 | 4 | 18 | 28 | 14 |
| 29 | 3 | 18 | 29 | 14 |
| 30 | 3 | 18 | 29 | 14 |
| 31 | 3 | 17 | 29 | 15 | wherein "Subpixel offset" column is defined in 1/32 subpixel resolution. In other words, the interpolation filter (such as subpixel interpolation filter) is represented by coefficients in the above table.

In a possible implementation form of the method according to the first aspect as such, the subpixel interpolation filter is selected from a set of filters used for intra-prediction process for a given subpixel offset. In other words, a filter (for example, the only filter or one of the filter set can be used for intra-prediction process) of intra-prediction process for a given subpixel offset is selected from a set of filters.

In a possible implementation form of the method according to the first aspect as such, the set of filters comprises a Gauss filter and a Cubic filter.

In a possible implementation form of the method according to the first aspect as such, wherein the quantity of the subpixel interpolation filter is N, wherein the N subpixel interpolation filters are used for intra reference sample interpolation and N>=1 and is a positive integer.

In a possible implementation form of the method according to the first aspect as such, reference samples being used to obtain values of predicted samples of the block are not adjacent to the block of predicted samples. Encoder may signal an offset value within a bitstream, so that this offset value indicates the distance between adjacent line of reference samples and the line of reference samples from which the values of predicted samples are derived. FIG. 24 represents the possible position of reference samples' lines and corresponding values of ref_offset variable. Variable "ref_offset" indicates which reference line is used, for example, when ref_offset=0, it represents "reference line 0" (as shown in FIG. 24) is used.

Example of offsets' values being used in a particular implementation of a video codec (e.g. video encoder or decoder) is as follows:

use adjacent line of reference samples (ref_offset=0, denoted by "Reference line 0" in FIG. 24); use first line (closest to the adjacent line) (ref_offset=1, denoted by "Reference line 1" in FIG. 24); use third line (ref_offset=3, denoted by "Reference line 3" in FIG. 24).

Directional intra prediction mode specifies the value of subpixel offset between two adjacent lines of predicted samples (deltaPos). This value is represented by a fixed-point integer value having 5-bits precision. For example, deltaPos=32 means that the offset between two adjacent lines of predicted samples is exactly one sample.

If intra prediction mode is greater than DIA_IDX (mode #34), for the above-described example, the value of main reference side size is calculated as follows. Among a set of available (i.e. that encoder may indicate for the block of predicted samples) intra predicted modes, the mode that is greater than DIA_IDX and provides the greatest deltaPos value is considered. The value of the desired subpixel offset is derived as follows: block height is summed up with ref_offset and multiplied by deltaPos value. If the result is divided by 32 with zero remainder, another greatest value of deltaPos as described above, but previously considered predicted modes are skipped when getting modes from the set of available intra predicted modes. Otherwise, the result of this multiplication is considered to be the greatest non-integer subpixel offset. An integer part of this offset is taken by shifting it right by 5 bits. Summing up the integer part of the greatest non-integer subpixel offset, width of the block of predicted samples, and a half of the length of interpolation filter.

Otherwise, if intra prediction mode is lesser than DIA_IDX (mode #34), for the above-described example, the value of main reference side size is calculated as follows. Among a set of available (i.e. that encoder may indicate for the block of predicted samples) intra predicted modes, the mode that is lesser than DIA_IDX and provides the greatest deltaPos value is considered. The value of the desired subpixel offset is derived as follows: block width is summed up with ref_offset and multiplied by deltaPos value. If the result is divided by 32 with zero remainder, another greatest value of deltaPos as described above, but previously considered predicted modes are skipped when getting modes from the set of available intra predicted modes. Otherwise, the result of this multiplication is considered to be the greatest non-integer subpixel offset. An integer part of this offset is taken by shifting it right by 5 bits. Summing up the integer part of the greatest non-integer subpixel offset, height of the block of predicted samples, and a half of the length of interpolation filter.

According to a second aspect the present disclosure relates to an intra-prediction method for predicting a current block included in a picture. The method comprises determining a size of a main reference side used in the intra-prediction based on an intra-prediction mode that provides, among available intra-prediction modes, a greatest non-integer value of a subpixel offset between a target sample among target samples (such as a current sample among current samples) in the current block and a reference sample used for predicting said target sample in the current block (wherein the reference sample is a reference sample among reference samples included in the main reference side) and a size of an interpolation filter to be applied on the reference samples included in the main reference side. The method further comprises applying an interpolation filter on the reference samples included in the main reference side to obtain filtered reference samples, and predicting the samples (such as the current samples or target samples) included in the current block based on the filtered reference samples.

Accordingly, the disclosure facilitates providing memory efficiency in video coding using intra-prediction.

For instance, the size of the main reference side is determined as a sum of an integer part of the greatest non-integer value of the subpixel offset, a size of a side of the current block, and a half of the size of the interpolation filter. In other words, advantages of the second aspect may correspond to the above mentioned advantages of the first aspect.

In some embodiments, the side of the current block is a width of the current block if the intra prediction mode is greater than a vertical intra prediction mode, VER_IDX, or the side of the current block is a height of the current block if the intra prediction mode is lesser than a horizontal intra prediction mode, HOR_IDX.

For instance, values of reference samples having positions in the main reference side that are greater than double the size of the side of the current block are set to be equal to a value of a sample having a sample position that is double the size of the current block.

For instance, the size of the main reference side is determined as a sum of:
a size of a side of the current block,
a half of the length of the interpolation filter minus one, and
a maximum of
the size of the side of the block, and
an integer part of the greatest non-integer value of the subpixel offset plus a half of the length of the interpolation filter (such as, the additional samples ref[refW+refIdx+x] with x=1 . . . (Max(1, nTbW/nTbH)*refIdx+1) are derived as follows: ref[refW+refIdx+x]=p[−1+refW][−1−refIdx]) or an integer part of the greatest non-integer value of the subpixel offset plus a half of the length of the interpolation filter plus one (such as, the additional samples ref[refW+refIdx+x] with x=1 . . . (Max(1, nTbW/nTbH)*refIdx+2) are derived as follows: ref[refW+refIdx+x]=p[−1+refW][−1−refIdx]).

According to a third aspect the present disclosure relates to an encoder comprising processing circuitry for carrying out the method according to the first or second aspect or any possible embodiment of the first or second aspect of the present disclosure.

According to a fourth aspect the present disclosure relates to a decoder comprising processing circuitry for carrying out the method according to the first or second aspect or any possible embodiment of the first or second aspect of the present disclosure.

According to a fifth aspect the present disclosure relates to an apparatus for intra-prediction of a current block included in a picture, the apparatus comprising an intra-prediction unit configured to predict target samples included in the current block based on filtered reference samples. The intra-prediction unit comprises a determination unit configured to determine a size of a main reference side used in the intra-prediction based on an intra-prediction mode that provides, among available intra-prediction modes, a greatest non-integer value of a subpixel offset between a target sample among the target samples in the current block and a reference sample used for predicting said target sample in the current block (with the reference sample being a reference sample among reference samples included in the main reference side) and a size of an interpolation filter to be applied on the reference samples included in the main reference side, and a filtering unit configured to apply an interpolation filter on the reference samples included in the main reference side to obtain the filtered reference samples.

Accordingly, the disclosure facilitates providing memory efficiency in video coding using intra-prediction.

In some embodiments, the determination unit determines the size of the main reference side as a sum of an integer part of the greatest non-integer value of the subpixel offset, a size of a side of the current block, and half of the size of the interpolation filter.

For instance, the side of the current block is a width of the current block if the intra prediction mode is greater than a vertical intra prediction mode, VER_IDX, or the side of the current block is a height of the current block if the intra prediction mode is lesser than a horizontal intra prediction mode, HOR_IDX.

For instance, values of reference samples having positions in the main reference side that are greater than double the size of the side of the current block are set to be equal to a value of a sample having a sample position that is double the size of the current block.

In some embodiments, the determination unit determines the size of the main reference side as a sum of:
the size of the side of the block, and
an integer part of the greatest non-integer value of the subpixel offset plus a half of the length of the interpolation filter or an integer part of the greatest non-integer value of the subpixel offset plus a half of the length of the interpolation filter plus one.

The determination unit may be configured: when the maximum of the two values M is equal to the size of a side of the block, not to perform right-padding; or when the maximum of the two values M is equal to the integer part of the greatest value of the subpixel offset plus the half of the length of the interpolation filter or to the integer part of the greatest non-integer value of the subpixel offset plus a half of the length of the interpolation filter plus one, to perform right padding.

In addition or alternatively, in some embodiments, the determination unit is configured to perform padding by replicating first and/or last samples of the main reference side to the left and/or to the right side respectively, in particular as follows: denoting the main reference side as ref, and the size of the main reference side as refS, the padding is represented as: ref[−1]=p[0], and/or ref[refS+1]=p[refS], wherein ref[−1] represents a value of the left to the main reference side, p[0] represents a value of the first reference sample of the main reference side, ref[refS+1] represents a value of the right to the main reference side, and p[refS] represents a value of the last reference sample of the main reference side.

The method according to the second aspect of the present disclosure can be performed by the apparatus according to the fifth aspect of the present disclosure. Further features and implementation forms of the apparatus according to the fifth aspect of the present disclosure correspond to the features and implementation forms of the method according to the second aspect or any possible embodiment of the second aspect of the present disclosure.

According to a sixth aspect, an apparatus is provided, which comprises modules/units/components/circuits to perform at least a part of the steps of the above method according to any preceding implementation of the any preceding aspect or the any preceding aspect as such.

The apparatus according to the aspect can be extended into implementation forms corresponding to the implementation forms of a method according to the any preceding aspect. Hence, an implementation form of the apparatus comprises the feature(s) of the corresponding implementation form of the method according to the any preceding aspect.

The advantages of the apparatuses according to the any preceding aspect are the same as those for the corresponding implementation forms of the method according to the any preceding aspect.

According to a seventh aspect the present disclosure relates to an apparatus for decoding a video stream includes a processor and a memory. The memory is storing instructions that cause the processor to perform the method according to the first aspect or any possible embodiment of the first aspect.

According to an eighth aspect the present disclosure relates to a video encoder for encoding a plurality of pictures into a bitstream, comprising the apparatus for intra-prediction of a current block according to any of the above-described embodiments.

According to a ninth aspect the present disclosure relates to a video decoder for decoding a plurality of pictures from a bitstream, comprising the apparatus for intra-prediction of a current block according to any of the above-described embodiments.

According to a tenth aspect, a computer-readable storage medium having stored thereon instructions that when executed cause one or more processors configured to code video data is proposed. The instructions cause the one or more processors to perform a method according to the first aspect or any possible embodiment of the first aspect.

According to an eleventh aspect, the present disclosure relates to a computer program comprising program code for performing the method according to the first aspect or any possible embodiment of the first aspect when executed on a computer.

In another aspect of the present application, a decoder comprising processing circuitry is disclosed configured for carrying out the above methods.

In another aspect of the present application, a computer program product is disclosed which comprising a program code for performing the above methods.

In another aspect of the present application, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above methods.

The processing circuitry can be implemented in hardware, or in a combination of hardware and software, for example by a software programmable processor or the like.

The aspects, embodiments and implementations described herein may provide the advantageous effects mentioned above with reference to the first aspect and the second aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which.

Figure 1A:
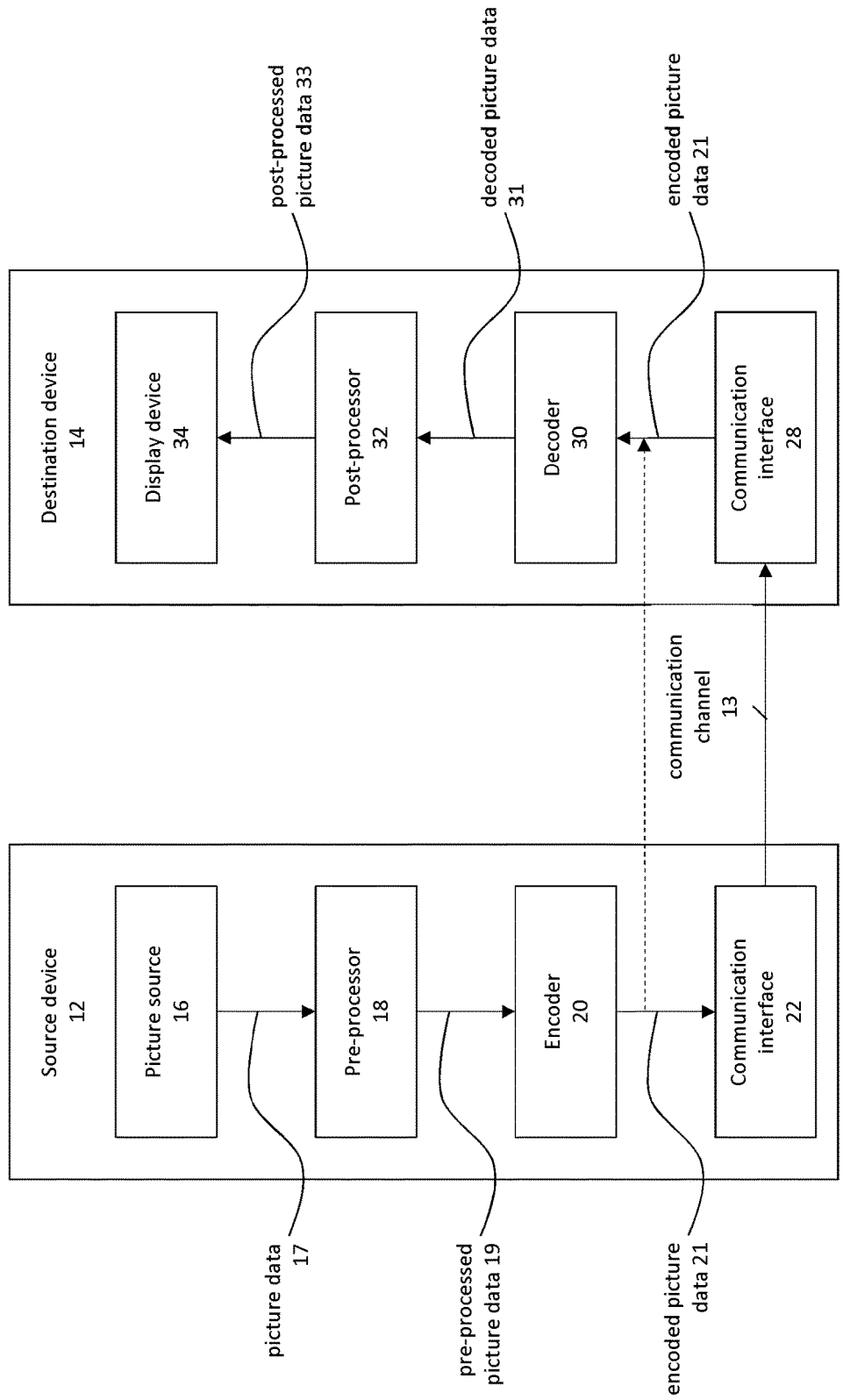
FIG. 1A is a block diagram showing an example of a video coding system configured to implement embodiments of the present disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used.

It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts, i.e. video encoding and video decoding. Video encoding is performed at the source side, typically comprising processing (e.g. by compression) the original video pictures to reduce the amount of data required for representing the video pictures (for more efficient storage and/or transmission).

Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
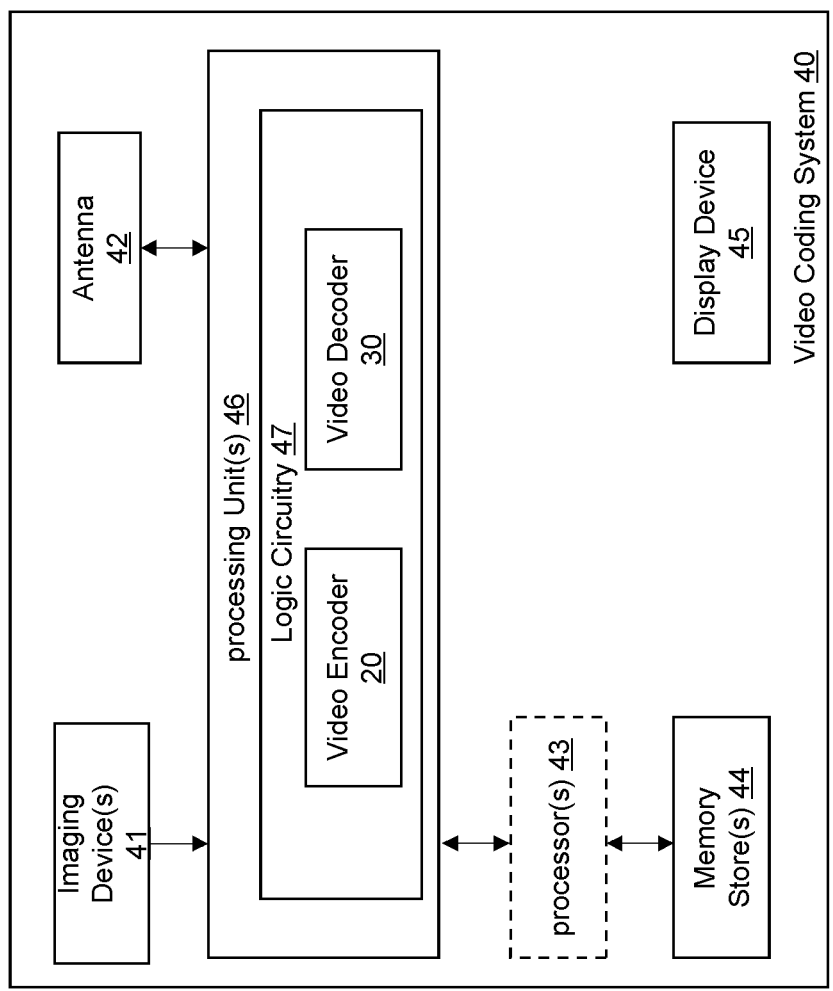
FIG. 1B is a block diagram showing another example of a video coding system configured to implement embodiments of the present disclosure.

The encoder 20 (e.g. a video encoder 20) and the decoder 30 (e.g. a video decoder 30) each may be implemented as any of a variety of suitable circuitry as shown in FIG. 1B, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
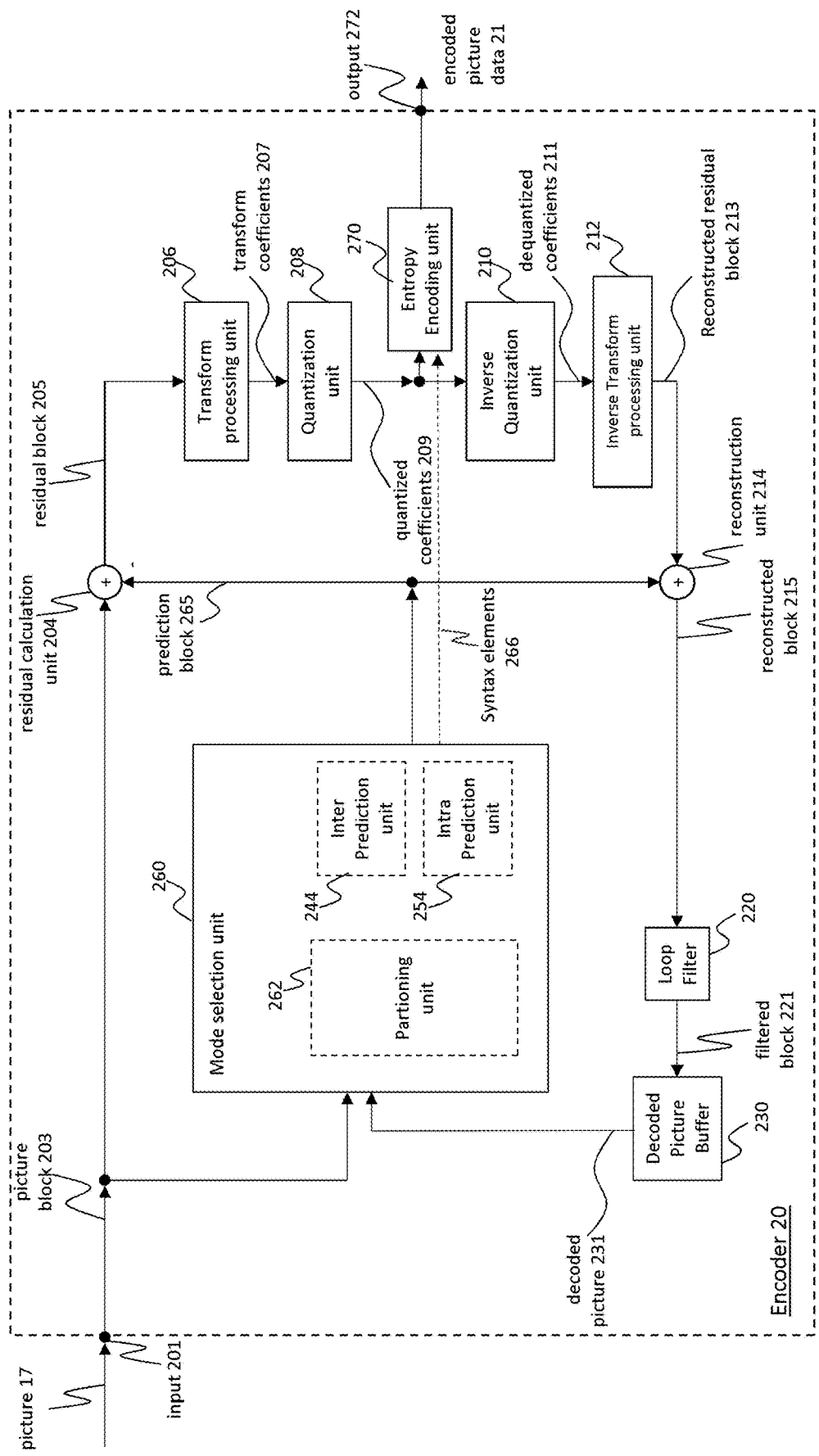
FIG. 2 is a block diagram showing an example of a video encoder configured to implement embodiments of the present disclosure.
Figure 3:
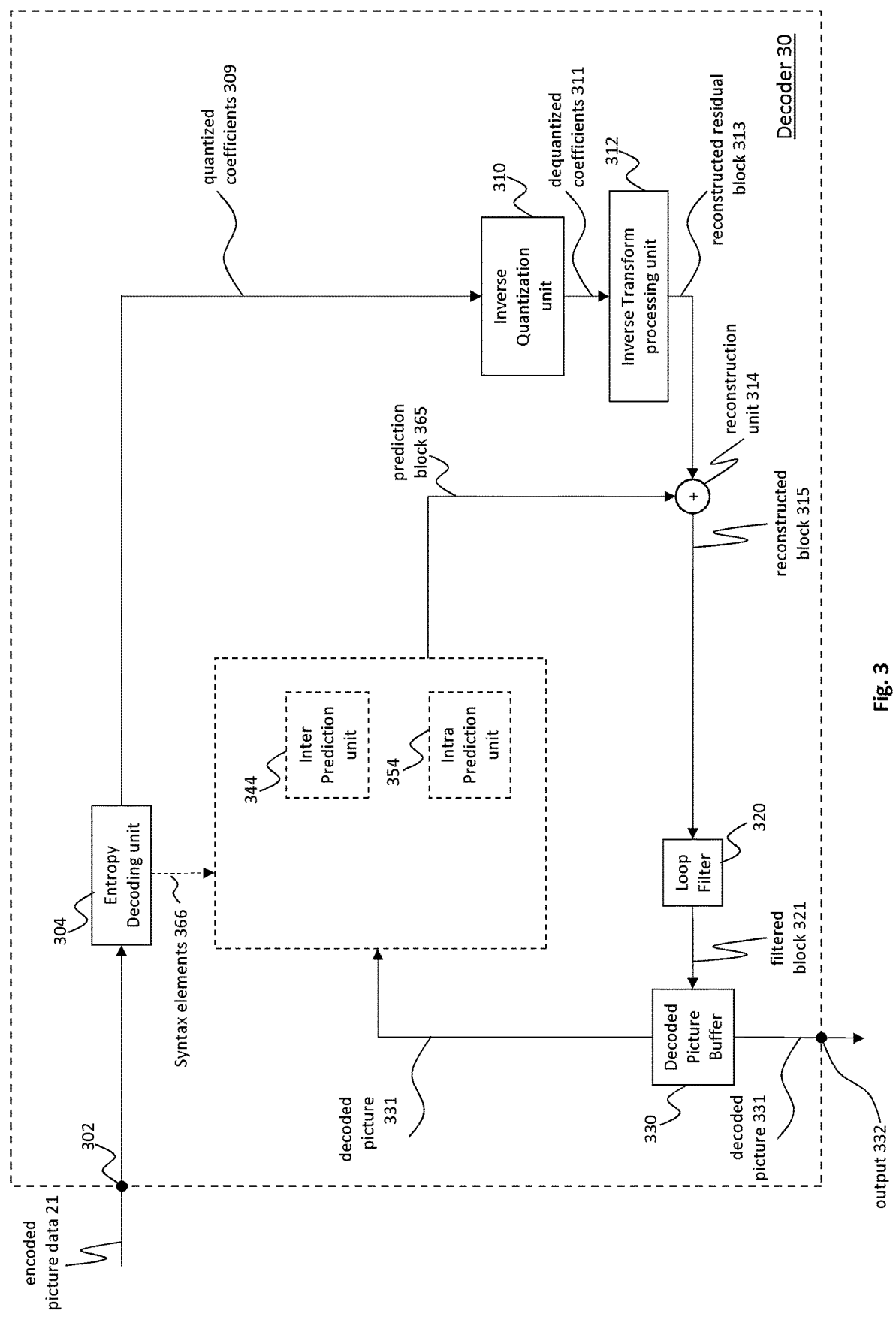
FIG. 3 is a block diagram showing an example structure of a video decoder configured to implement embodiments of the present disclosure.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

For convenience of description, embodiments of the present disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Encoder and Encoding Method FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown) . . . . The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
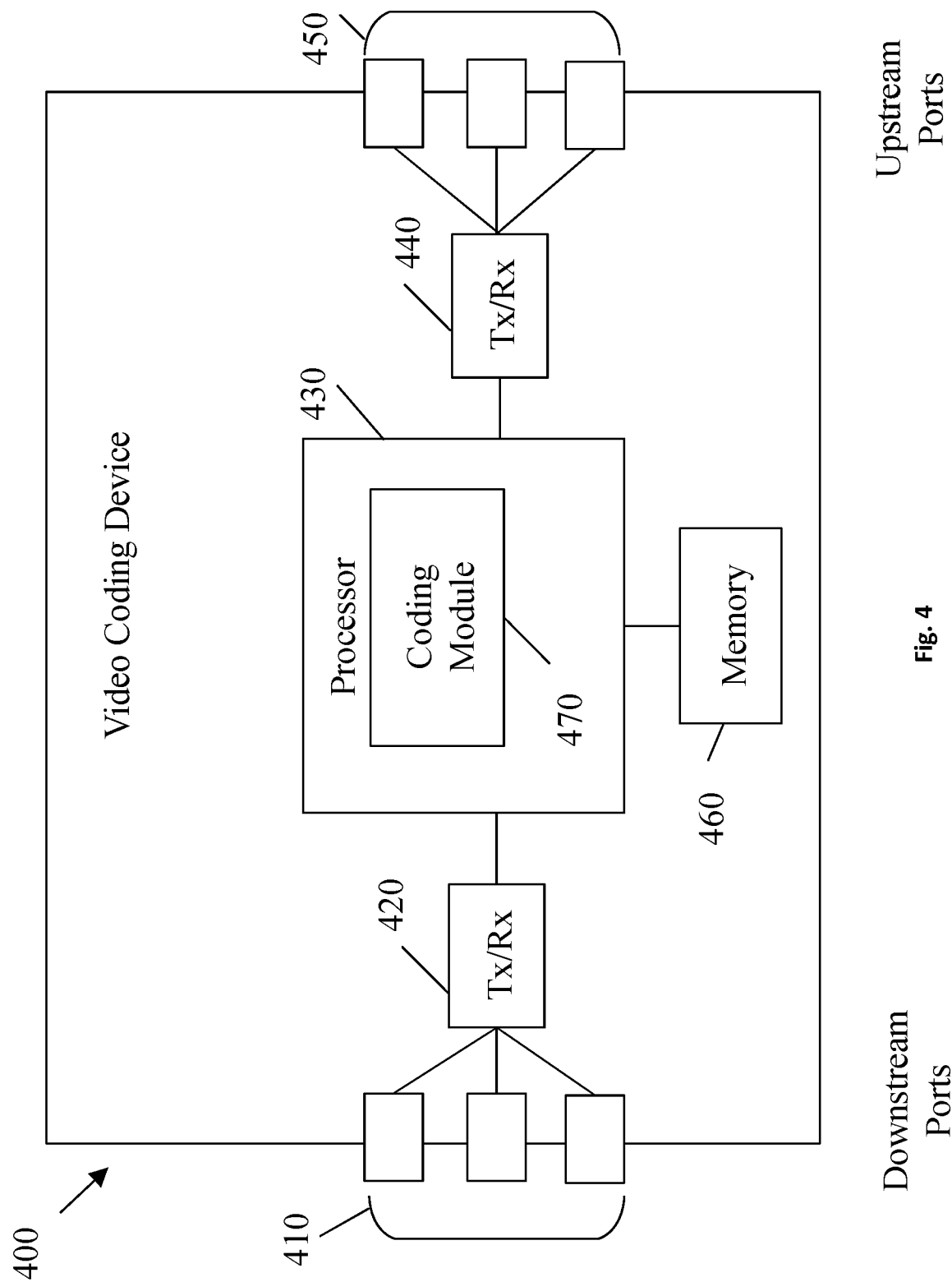
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
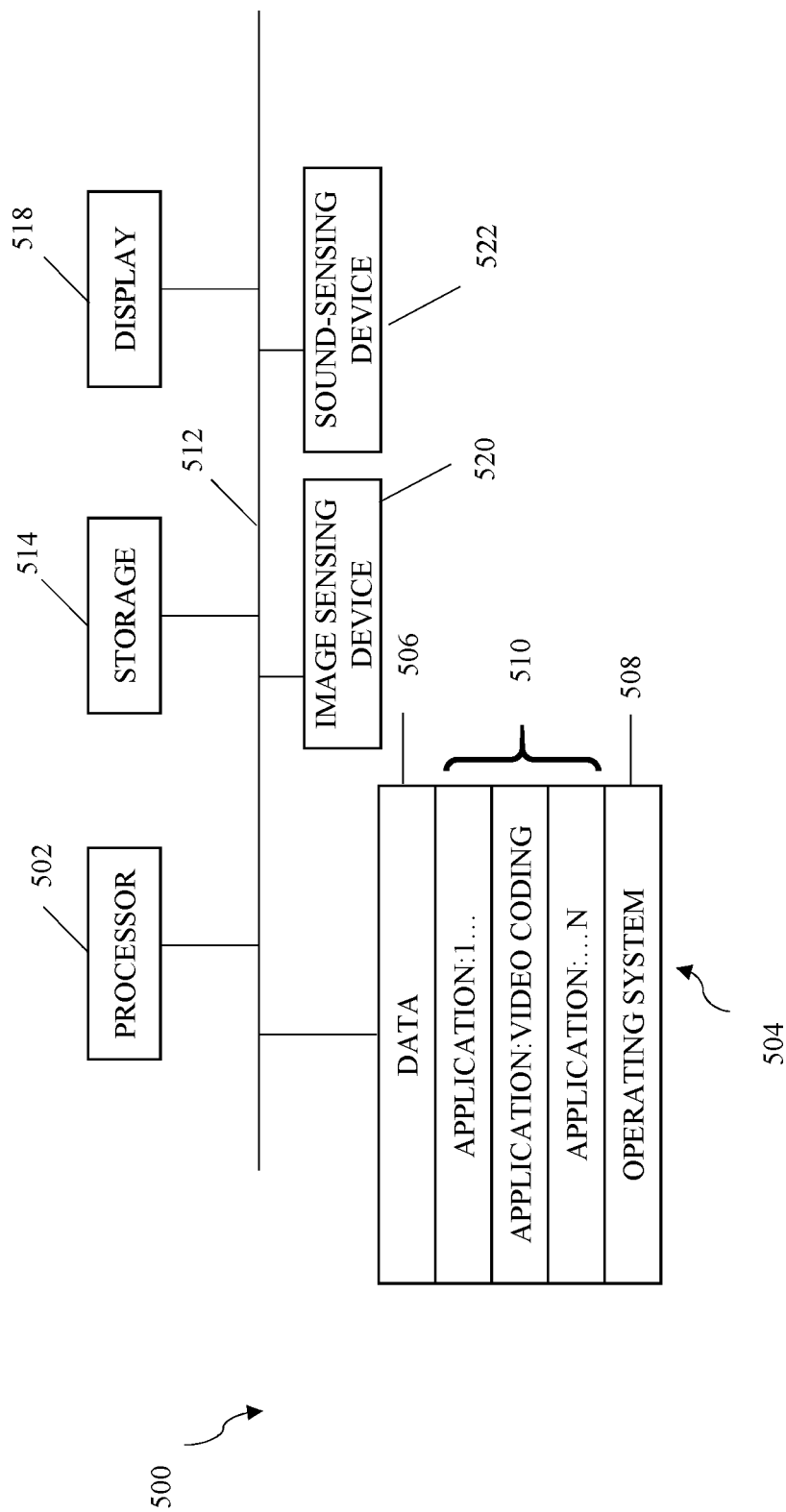
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Definitions of Acronyms & Glossary

JEM Joint Exploration Model (the software codebase for future video coding exploration)
JVET Joint Video Experts Team
LUT Look-Up Table
QT QuadTree
QTBT QuadTree plus Binary Tree
RDO Rate-distortion Optimization
ROM Read-Only Memory
VTM VVC Test Model
VVC Versatile Video Coding, the standardization project developed by JVET.
CTU/CTB Coding Tree Unit/Coding Tree Block
CU/CB Coding Unit/Coding Block
PU/PB Prediction Unit/Prediction Block
TU/TB Transform Unit/Transform Block
HEVC High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the present disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

Figure 6:
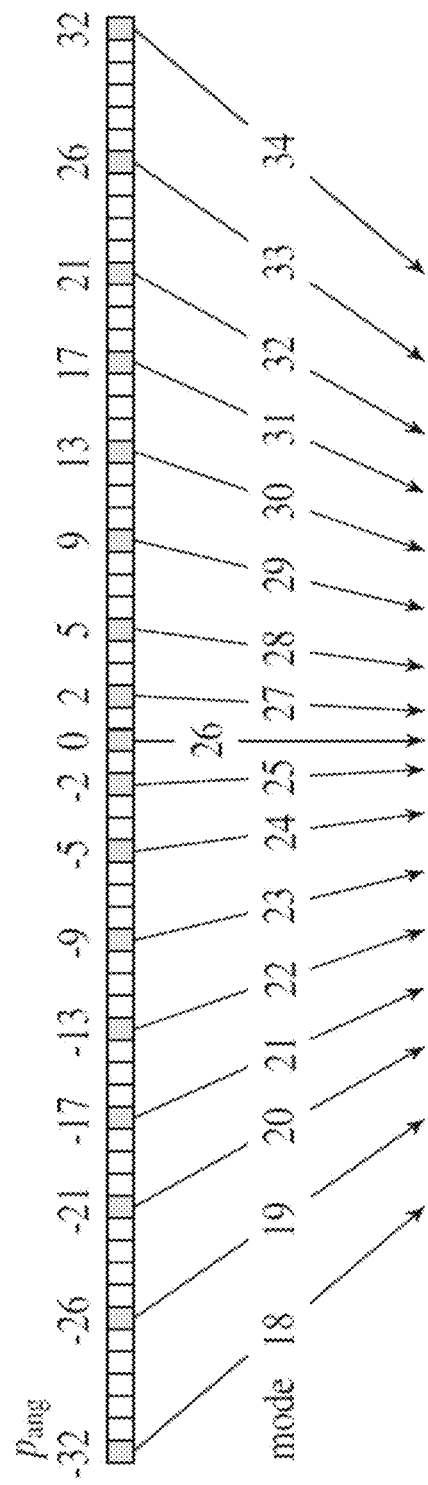
FIG. 6 shows Angular intra prediction directions and modes and the associated value of $p_{ang}$ for vertical prediction directions.

For directional intra prediction, intra prediction modes are available representing different prediction angles from diagonal-up to diagonal-down. For definition of the prediction angles, an offset value pang on a 32-sample grid is defined. The association of $p_{ang}$ to the corresponding intra prediction mode is visualized in FIG. 6 for the vertical prediction modes. For the horizontal prediction modes the scheme is flipped to vertical direction and the $p_{ang}$ values are assigned accordingly. As stated above, all angular prediction modes are available for all applicable intra prediction block sizes. They all use the same 32-sample grid for the definition of the prediction angles. The distribution of the $p_{ang}$ values over the 32-sample grid in FIG. 6 reveals an increased resolution of the prediction angles around the vertical direction and a coarser resolution of the prediction angles towards the diagonal directions. The same applies to the horizontal directions. This design stems from the observation that in lots of video content, approximately horizontal and vertical structures play an important role compared to diagonal structures.

Figure 7:
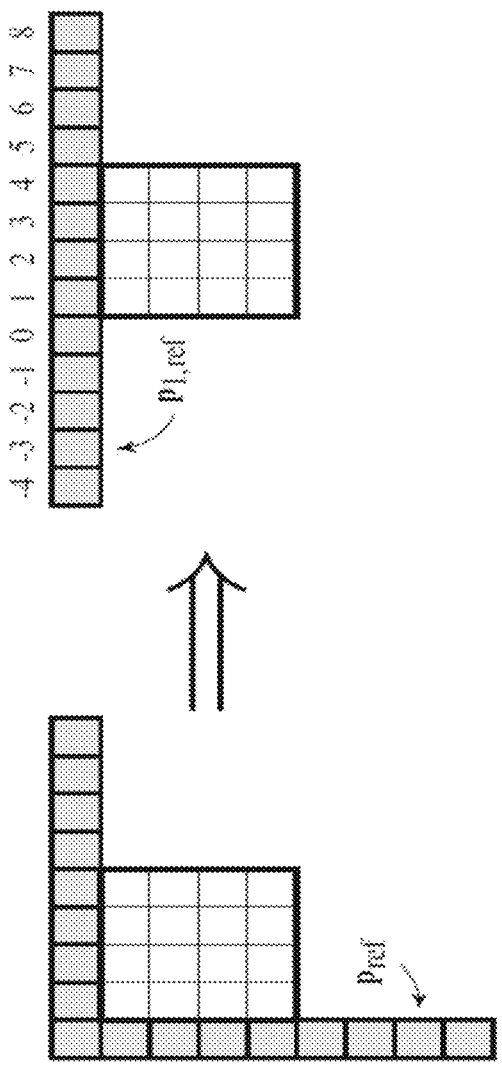
FIG. 7 shows Transformation of $p_{ref}$ to $p_{1,ref}$ for a 4×4 block.
Figure 8:
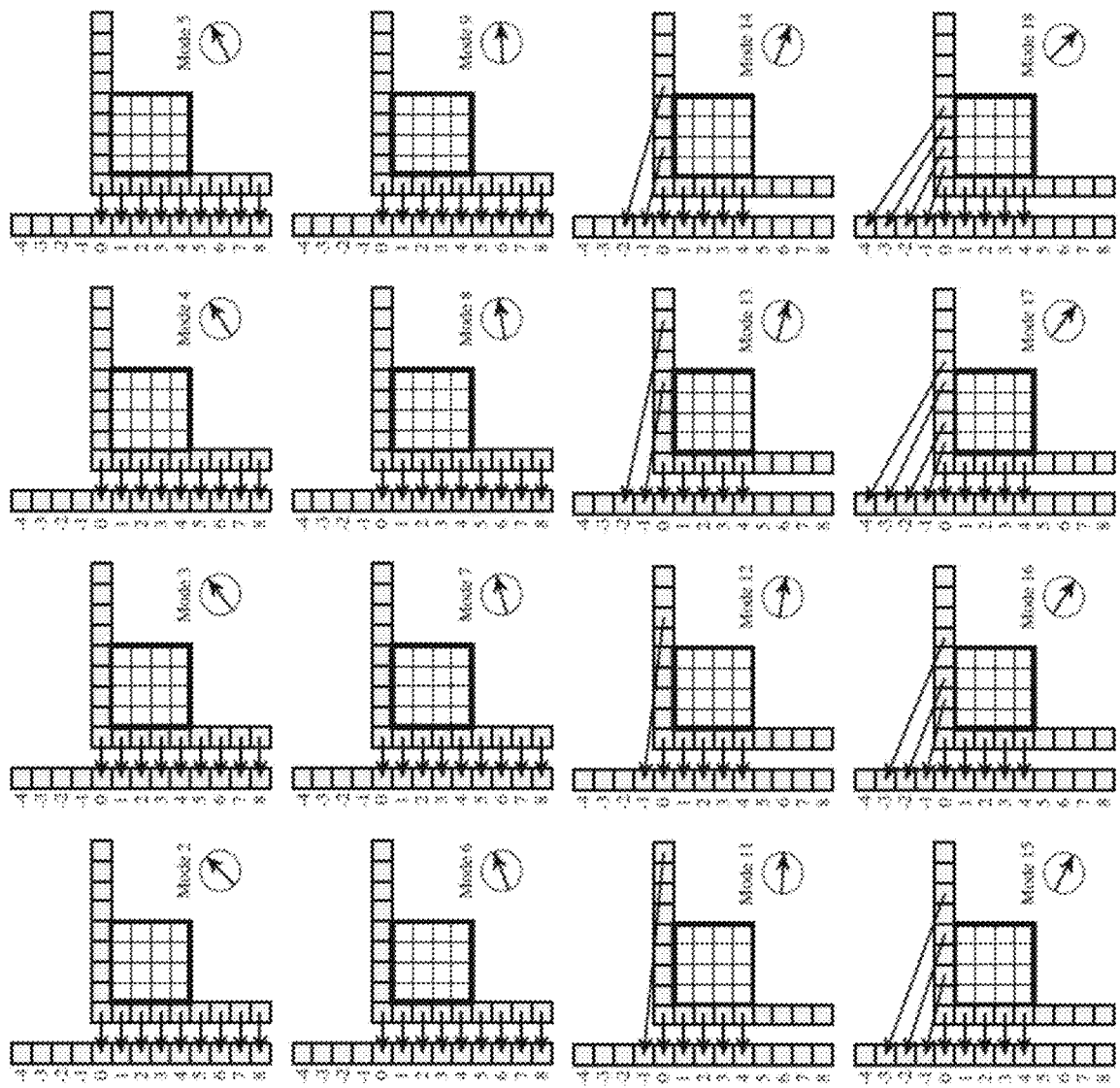
FIG. 8 shows Construction of $p_{1,ref}$ for horizontal angular prediction.
Figure 9:
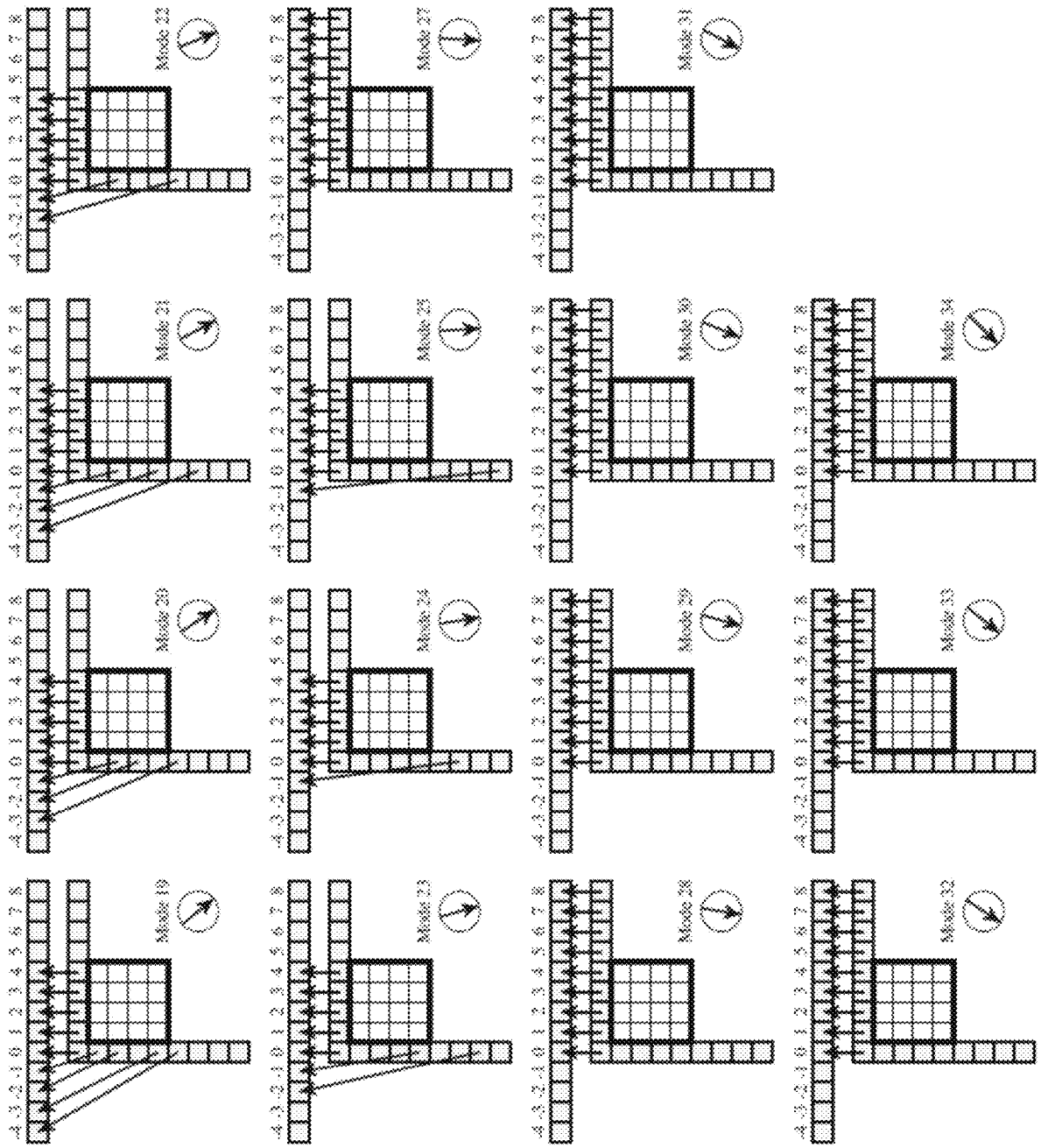
FIG. 9 shows Construction of $p_{1,ref}$ for vertical angular prediction.

While for the horizontal and vertical prediction directions, the selection of samples to be used for prediction is straightforward, this task requires more effort in case of angular prediction. For modes 11-25, when predicting the current block Bc from the set of prediction samples $p_{ref}$ (also known as main reference side) in an angular direction, samples of both, the vertical and the horizontal part of $p_{ref}$ can be involved. Since the determination of the location of the respective samples on either of the branches of $p_{ref}$ requires some computational effort, a unified one-dimensional prediction reference has been designed for HEVC intra prediction. The scheme is visualized in FIG. 7. Before performing the actual prediction operation, the set of reference samples $p_{ref}$ is mapped to a 1-dimensional vector $p_{1,ref}$. The projection which is used for the mapping depends on the direction indicated by the intra prediction angle of the respective intra prediction mode. Only reference samples from the part of $p_{ref}$ which is to be used for prediction are mapped to $p_{1,ref}$. The actual mapping of the reference samples to $p_{1,ref}$ for each angular prediction mode is depicted in FIGS. 8 and 9 for horizontal and vertical angular prediction directions, respectively. The reference samples set $p_{1,ref}$ is constructed once for the block of predicted samples. The prediction is then derived from two neighboring reference samples in the set as detailed below. As can be seen from FIGS. 8 and 9 the 1-dimensional reference sample set is not completely filled for all intra prediction modes. Only the locations which are in the projection range for the corresponding intra prediction direction are included in the set.

The prediction for both, horizontal and vertical prediction modes is performed in the same manner with only swapping the x and y coordinates of the block. The prediction from $p_{1,ref}$ is performed in ⅓₂-pel accuracy. Depending on the value of the angle parameter pang, a sample offset $i_{idx}$ in $p_{1,ref}$ and a weighting factor $i_{fact}$ for a sample at position (x, y) are determined. Here, the derivation for the vertical modes is provided. The derivation for the horizontal modes follows accordingly, swapping x and y.

$$i_{idx} = (y+1) \cdot \frac{p_{ang}}{32}, \; i_{fact} = [(y+1) \cdot p_{ang}] \bmod 32.$$

If ifact is not equal to 0, i.e. the prediction does not fall exactly on a full sample location in $p_{1,ref}$, a linear weighting between the two neighboring sample locations in $p_{1,ref}$ is performed as $$B_c(x,y) = \frac{32 - i_{fact}}{32} \cdot p_{1,ref}(x + i_{idx} + 1) + \frac{i_{fact}}{32} \cdot p_{1,ref}(x + i_{idx} + 2),$$

with 0≤x, y<Nc. It should be noted that the values of $i_{idx}$ and $i_{fact}$ only depend on y and therefore only need to be calculated once per row (for vertical prediction modes).

The VTM-1.0 (Versatile Test Model) uses 35 Intra modes whereas the BMS (Benchmark Set) uses 67 Intra modes. Intra-prediction is a mechanism used in many video coding frameworks to increase compression efficiency in the cases where only a given frame can be involved.

Figure 10A:
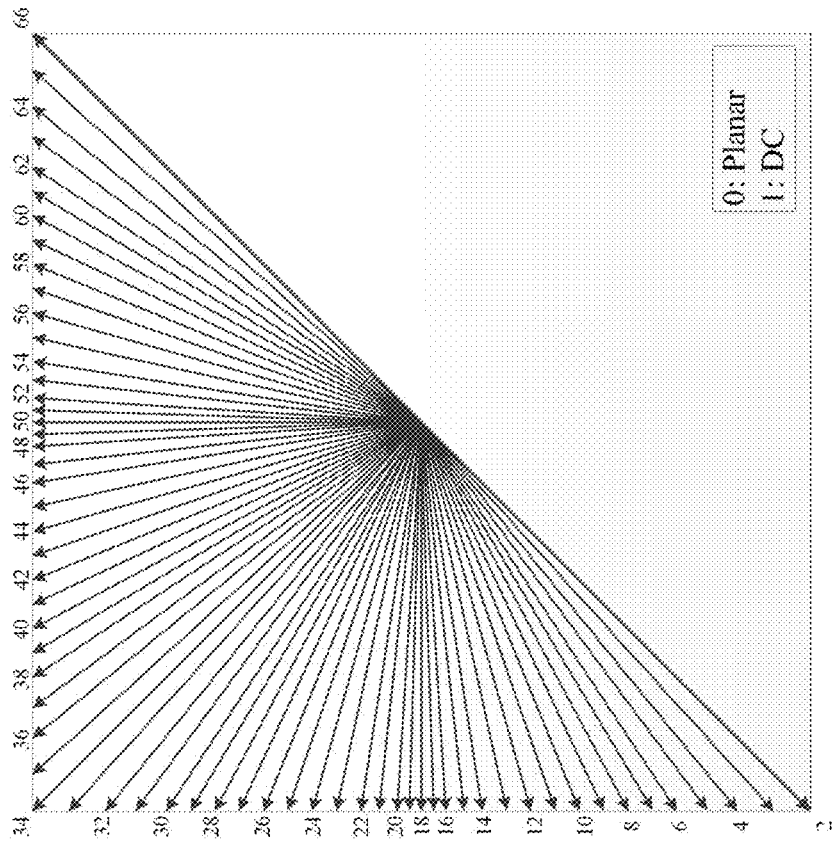
FIG. 10A shows Angular intra prediction directions and modes and the associated value of $p_{ang}$ f A set of intra-prediction modes in JEM and BMS-1.

FIG. 10A shows an example of 67 intra prediction modes, e.g., as proposed for VVC, the plurality of intra prediction modes of 67 intra prediction modes comprising: planar mode (index 0), d mode (index 1), and angular modes with indices 2 to 66, wherein the left bottom angular mode in FIG. 10A refers to index 2 and the numbering of the indices being incremented until index 66 being the top right most angular mode of FIG. 10A.

Figure 10B:
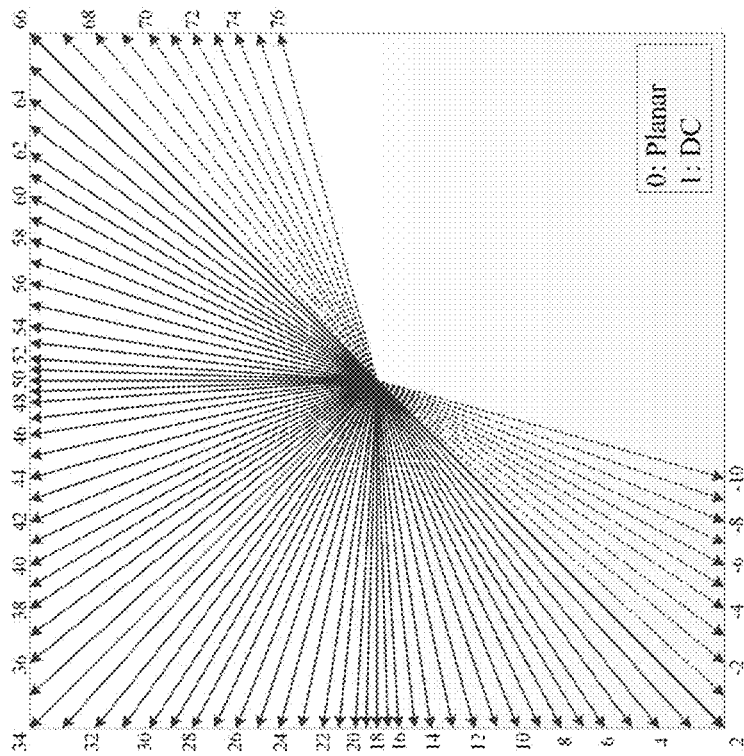
FIG. 10B shows Angular intra prediction directions and modes and the associated value of $p_{ang}$ f A set of intra-prediction modes in VVC draft 2.

As shown in FIG. 10B, the latest version of VVC has some modes corresponding to skew intra prediction directions, including wide angle ones (shown as dashed lines). For any of these modes, to predict samples within a block interpolation of a set of neighboring reference samples should be performed, if a corresponding position within a block side is fractional. HEVC and VVC uses linear interpolation between two adjacent reference samples. JEM uses more sophisticated 4-tap interpolation filters. Filter coefficients are selected to be either Gaussian or Cubic ones depending on the width or on the height value. Decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Specific filter coefficient used in JEM are given in Table 1. Predicted sample is calculated by convoluting with coefficients selected from Table 1 according to subpixel offset and filter type as follows:

$$s(x) = \left\{ \sum_{i=0}^{i<4} (ref_{i+x} \cdot c_i) + 128 \right\} \gg 8$$

In this equation, ">>" indicates a bitwise shift-right operation.

An offset between a sample to be predicted (or "predicted sample", for short) in the current block and an interpolated sample position may be have an integer part and a non-integer part if the offset has subpixel resolution such as ⅓₂ pixel. In Table 1, as well as Tables 2 and 3, the column "Subpixel offset" refers to a non-integer part of the offset, e.g. a fractional offset, a fractional part of the offset, or a fractional sample position.

If Cubic filter is selected, predicted sample is further clipped to the allowed range of values, that is either defined in SPS or derived from the bit depth of the selected component.

TABLE 1

Intra prediction interpolation filters used in JEM

| Subpixel offset | Cubic filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 256 | 0 | 0 | 47 | 161 | 47 | 1 |
| 1 | −3 | 252 | 8 | −1 | 43 | 161 | 51 | 1 |
| 2 | −5 | 247 | 17 | −3 | 40 | 160 | 54 | 2 |
| 3 | −7 | 242 | 25 | −4 | 37 | 159 | 58 | 2 |
| 4 | −9 | 236 | 34 | −5 | 34 | 158 | 62 | 2 |
| 5 | −10 | 230 | 43 | −7 | 31 | 156 | 67 | 2 |
| 6 | −12 | 224 | 52 | −8 | 28 | 154 | 71 | 3 |
| 7 | −13 | 217 | 61 | −9 | 26 | 151 | 76 | 3 |
| 8 | −14 | 210 | 70 | −10 | 23 | 149 | 80 | 4 |
| 9 | −15 | 203 | 79 | −11 | 21 | 146 | 85 | 4 |
| 10 | −16 | 195 | 89 | −12 | 19 | 142 | 90 | 5 |
| 11 | −16 | 187 | 98 | −13 | 17 | 139 | 94 | 6 |
| 12 | −16 | 179 | 107 | −14 | 16 | 135 | 99 | 6 |
| 13 | −16 | 170 | 116 | −14 | 14 | 131 | 104 | 7 |
| 14 | −17 | 162 | 126 | −15 | 13 | 127 | 108 | 8 |
| 15 | −16 | 153 | 135 | −16 | 11 | 123 | 113 | 9 |
| 16 (half-pel) | −16 | 144 | 144 | −16 | 10 | 118 | 118 | 10 |
| 17 | −16 | 135 | 153 | −16 | 9 | 113 | 123 | 11 |
| 18 | −15 | 126 | 162 | −17 | 8 | 108 | 127 | 13 |
| 19 | −14 | 116 | 170 | −16 | 7 | 104 | 131 | 14 |
| 20 | −14 | 107 | 179 | −16 | 6 | 99 | 135 | 16 |
| 21 | −13 | 98 | 187 | −16 | 6 | 94 | 139 | 17 |
| 22 | −12 | 89 | 195 | −16 | 5 | 90 | 142 | 19 |
| 23 | −11 | 79 | 203 | −15 | 4 | 85 | 146 | 21 |
| 24 | −10 | 70 | 210 | −14 | 4 | 80 | 149 | 23 |
| 25 | −9 | 61 | 217 | −13 | 3 | 76 | 151 | 26 |
| 26 | −8 | 52 | 224 | −12 | 3 | 71 | 154 | 28 |
| 27 | −7 | 43 | 230 | −10 | 2 | 67 | 156 | 31 |
| 28 | −5 | 34 | 236 | −9 | 2 | 62 | 158 | 34 |
| 29 | −4 | 25 | 242 | −7 | 2 | 58 | 159 | 37 |
| 30 | −3 | 17 | 247 | −5 | 2 | 54 | 160 | 40 |
| 31 | −1 | 8 | 252 | −3 | 1 | 51 | 161 | 43 |

Another set of interpolation filters that have 6-bit precision is presented in Table 2.

TABLE 2

A set of interpolation filters with 6-bit precision

| Sub pixel offset | Unified intra/inter filter | | | | Gaussian filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 14 | 29 | 18 | 3 |
| 3 | −2 | 60 | 7 | −1 | 14 | 29 | 18 | 3 |
| 4 | −2 | 58 | 10 | −2 | 14 | 28 | 18 | 4 |
| 5 | −3 | 57 | 12 | −2 | 13 | 28 | 19 | 4 |
| 6 | −4 | 56 | 14 | −2 | 12 | 28 | 20 | 4 |
| 7 | −4 | 55 | 15 | −2 | 12 | 27 | 20 | 5 |
| 8 | −4 | 54 | 16 | −2 | 11 | 27 | 21 | 5 |
| 9 | −5 | 53 | 18 | −2 | 11 | 27 | 21 | 5 |
| 10 | −6 | 52 | 20 | −2 | 10 | 26 | 22 | 6 |
| 11 | −6 | 49 | 24 | −3 | 10 | 26 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 (half-pel) | −4 | 36 | 36 | −4 | 7 | 25 | 25 | 7 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 26 | 10 |
| 22 | −2 | 20 | 52 | −6 | 6 | 22 | 26 | 10 |
| 23 | −2 | 18 | 53 | −5 | 5 | 21 | 27 | 11 |
| 24 | −2 | 16 | 54 | −4 | 5 | 21 | 27 | 11 |
| 25 | −2 | 15 | 55 | −4 | 5 | 20 | 27 | 12 |
| 26 | −2 | 14 | 56 | −4 | 4 | 20 | 28 | 12 |
| 27 | −2 | 12 | 57 | −3 | 4 | 19 | 28 | 13 |
| 28 | −2 | 10 | 58 | −2 | 4 | 18 | 28 | 14 |
| 29 | −1 | 7 | 60 | −2 | 3 | 18 | 29 | 14 |
| 30 | 0 | 4 | 62 | −2 | 3 | 18 | 29 | 14 |
| 31 | 0 | 2 | 63 | −1 | 3 | 17 | 29 | 15 |

Intra-predicted sample is calculated by convoluting with coefficients selected from Table 1 according to subpixel offset and filter type as follows:

$$s(x) = \left\{\sum_{i=0}^{i<4}(ref_{i+x} \cdot c_i) + 32\right\} \gg 6$$

In this equation, ">>" indicates a bitwise shift-right operation.

Another set of interpolation filters that have 6-bit precision is presented in Table 3.

TABLE 3

A set of interpolation filters with 6-bit precision

| Sub pixel offset | Unified intra/inter filter | | | | Gaussian filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 (half-pel) | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

Figure 11:
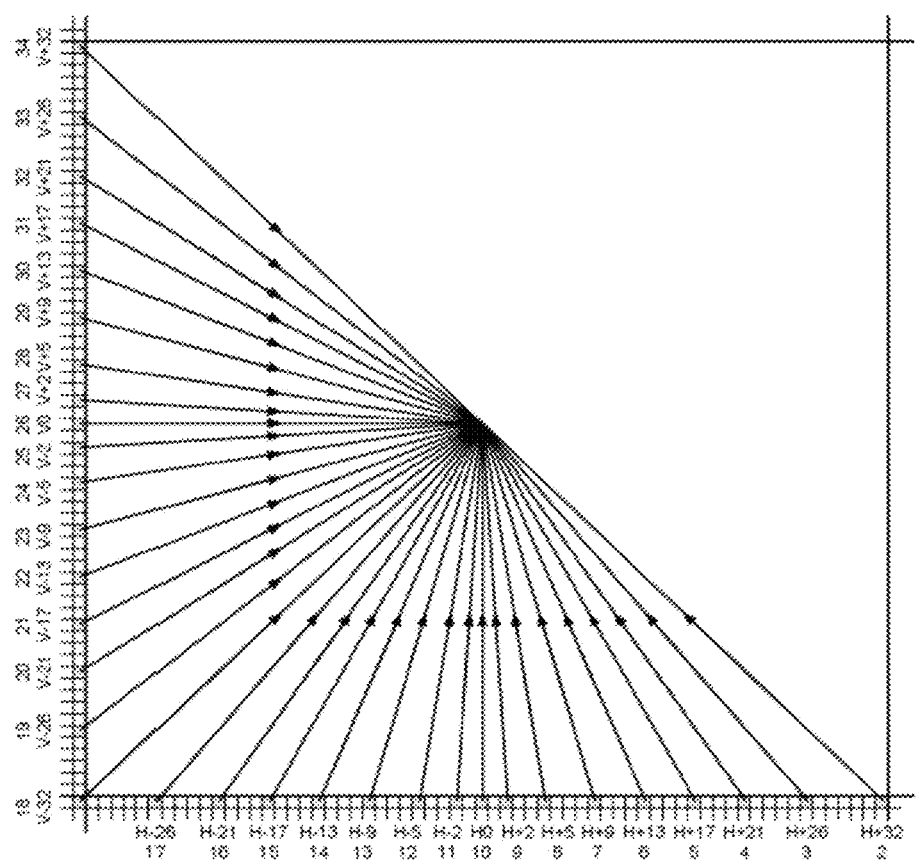
FIG. 11 shows Intra-prediction modes in HEVC [1]

FIG. 11 illustrates a schematic diagram of a plurality of intra prediction modes used in the HEVC UIP scheme. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a chroma value for the block matches the luma value for the block. The directional modes may perform predictions based on adjacent blocks as shown in FIG. 11.

H.264/AVC and HEVC specifies that a low-pass filter could be applied to reference samples prior being used in intra prediction process. A decision on whether to use reference sample filter or not is determined by intra prediction mode and block size. This mechanisms may be referred to as Mode Dependent Intra Smoothing (MDIS). There also exists a plurality of methods related to MDIS. For example, the Adaptive Reference Sample Smoothing (ARSS) method may explicitly (i.e. a flag is included into a bitstream) or implicitly (i.e., for example, data hiding is used to avoid putting a flag into a bitstream to reduce signaling overhead) signal whether the prediction samples are filtered. In this case, the encoder may make the decision on smoothing by testing the Rate-Distortion (RD) cost for all potential intra prediction modes.

As shown in FIG. 10B, the latest version of VVC has some modes corresponding to skew intra prediction directions. For any of these modes, to predict samples within a block interpolation of a set of neighboring reference samples should be performed, if a corresponding position within a block side is fractional. HEVC and VVC use linear interpolation between two adjacent reference samples. JEM uses more sophisticated 4-tap interpolation filters. Filter coefficients are selected to be either Gaussian or Cubic ones depending on the width or on the height value. A decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Figure 12:
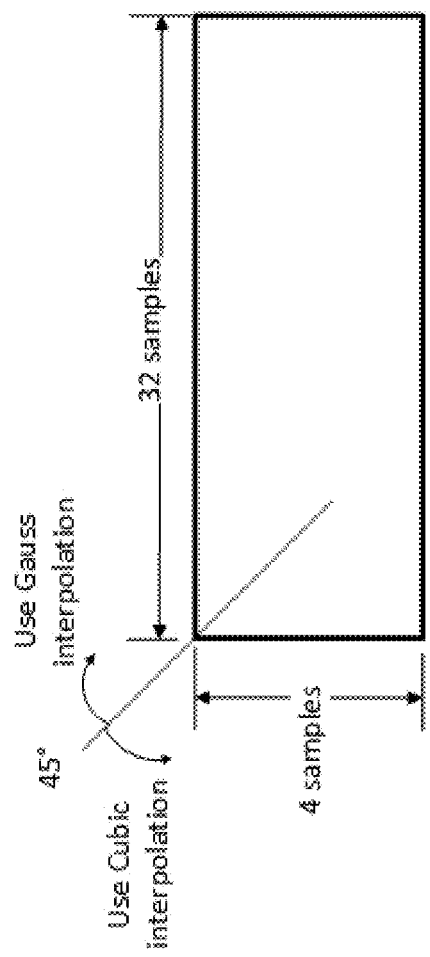
FIG. 12 shows an example of interpolation filter selection.

An example of interpolation filter selection for modes smaller and greater than diagonal one (denoted as 45°) in the case of 32×4 block is shown in FIG. 12.

Figure 13:
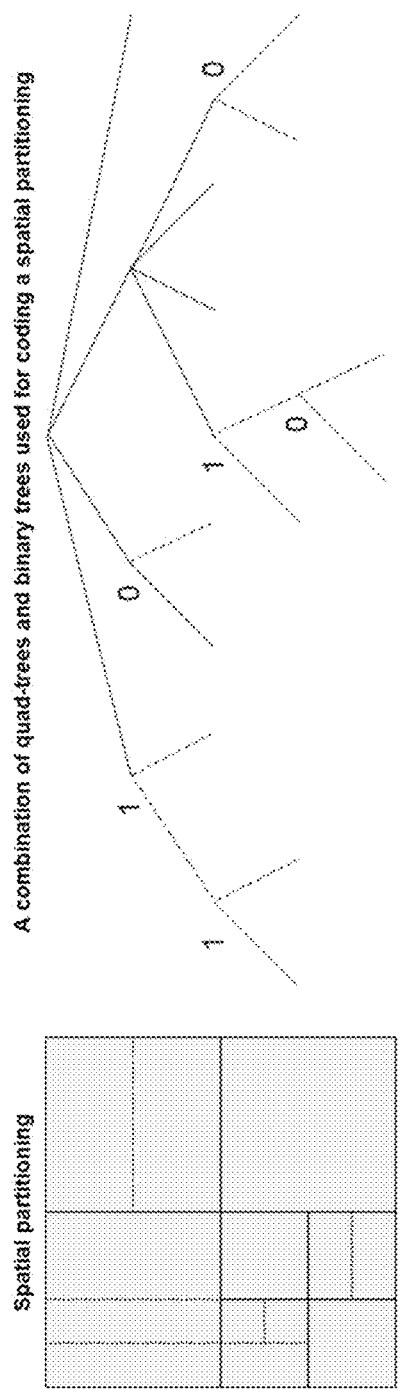
FIG. 13 shows QTBT explained.

In VVC, a partitioning mechanism based on both quad-tree and binary tree and known as QTBT is used. As depicted in FIG. 13, QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree.

However, VVC in its current state applies the same filter to the both sides of reference samples (left and top ones). No matter whether a block is oriented vertically or horizontally, a reference sample filter will be the same for both reference sample sides.

Figure 14:
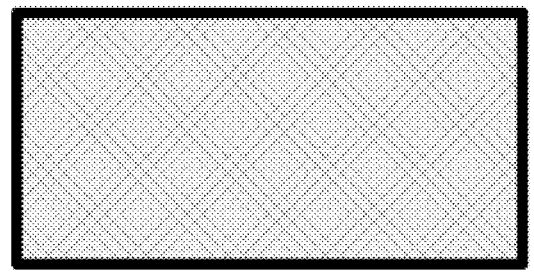
FIG. 14 shows Orientation of rectangular blocks.
Figure 14:
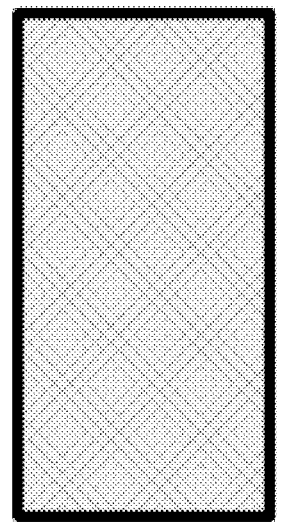

In this document, the terms "vertically oriented block" ("vertical orientation of a block") and "horizontally oriented block" ("horizontal orientation of a block") are applied to rectangular blocks generated by the QTBT framework. These terms have the same meaning as shown in FIG. 14.

For directional intra prediction modes with positive subsample offsets it is necessary to determine the memory size used to store the values of reference samples. However, this size depends on not only the dimensions of a block of predicted samples, but also on the processing that is further applied to these samples. Specifically, in case of positive subsample offsets interpolation filtering would require increased size of the main reference side as compared to the case when it is not applied. Interpolation filtering is performed by convolving reference samples with a filter core. Hence, the increase is caused by additional samples that convolution operation requires to calculate convolution result for the leftmost and rightmost part of the main reference side.

By using the steps described below it is possible to determine the size of the main reference side and hence to reduce the amount of internal memory that is required to store samples of the main reference side.

FIGS. 15A, 15B, 15C to 18 show some example of intra-predicting of a block from reference samples of the main reference side. For each row of samples of a block of predicted samples, a (possibly fractional) subpixel offset is determined. This offset may have integer or non-integer value depending on the difference between the selected directional intra prediction mode M and orthogonal intra prediction mode M (either HOR_IDX or VER_IDX, depending on which of those is closer to the selected intra prediction mode).

Tables 4 and 5 represents the possible values of a subpixel offset for the first row of predicted samples depending on the modes difference. Subpixel offsets for the other rows of predicted samples is obtained by multiplying the subpixel offset for difference between the position of a row the predicted samples and the first row.

TABLE 4

Dependency of subpixel offset on the modes difference for the first row of predicted samples

| $|M-M_o|$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| Subpixel offset | 0 | 1 | 2 | 3 | 5 | 7 | 9 | 11 | 13 | 15 | 17 | 19 | 21 | 23 | 26 | 29 | 32 | 35 | 39 | 45 | 49 | 54 | 60 | 68 | 79 | 93 | 114 |

TABLE 5

Dependency of subpixel offset on the modes difference for the first row of predicted samples (another example)

| $|M-M_o|$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| Subpixel offset | 0 | 1 | 2 | 3 | 4 | 6 | 8 | 10 | 12 | 14 | 16 | 18 | 20 | 23 | 26 | 29 | 32 | 35 | 39 | 45 | 51 | 57 | 64 | 73 | 86 | 102 | 128 |

Figure 15A:
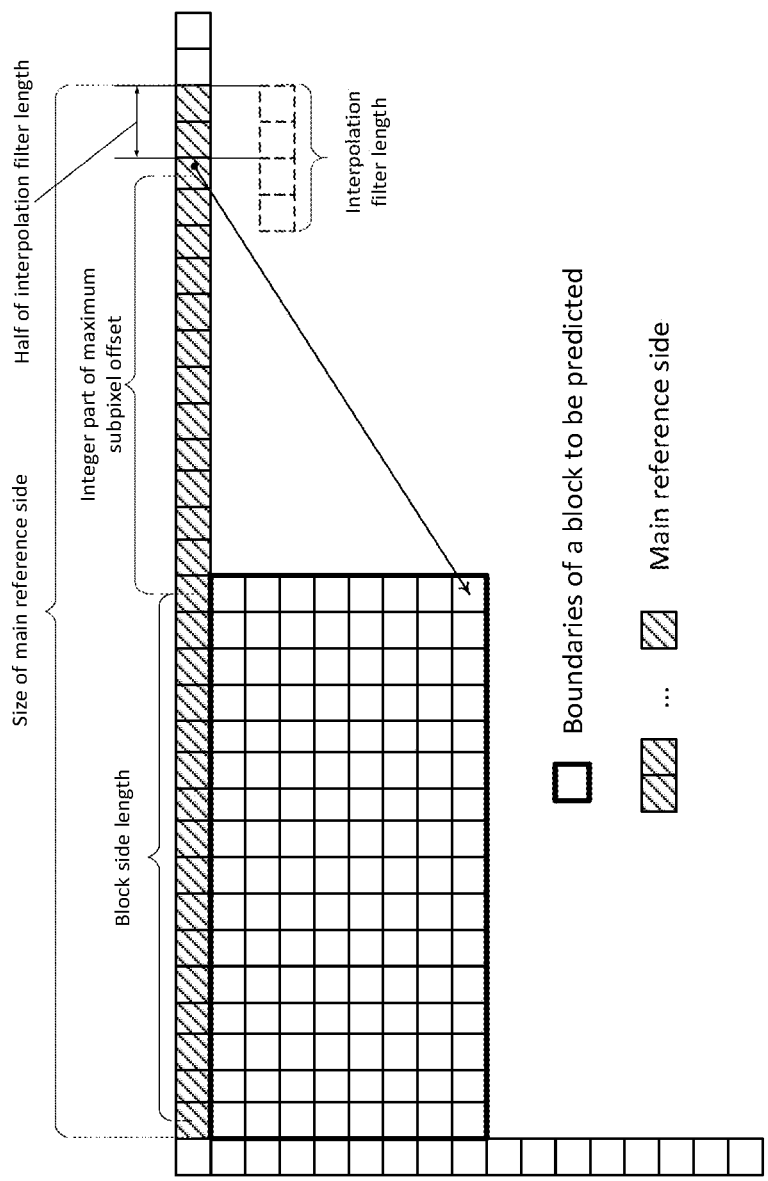
FIGS. 15A, 15B and 15C show three examples of intra-predicting of a block from reference samples of the main reference side.

If Table 4 or Table 5 is used to determine subpixel offset for the bottom-right predicted sample, it could be noticed that the main reference side size is equal to a sum of the integer part of greatest or maximum subpixel offset, a size of a side of the block of predicted samples (i.e. block side length) and a half of the length of interpolation filter (i.e. a half of interpolation filter length), as shown in FIG. 15A.

The following steps could be performed to obtain a size of the main reference side for the selected directional intra prediction mode that provides positive values of subpixel offset.

1. Step one may consist in determining what side of the block should be taken as the main side based on the index of the selected intra prediction mode and what neighboring samples should be used to generate main reference side. The main reference side is a line of reference samples used in the prediction of the samples in the current block. The "main side" is a side of the block that is to which the main reference side is parallel. If (intra-prediction) mode is greater or equal to the diagonal mode (mode 34, as shown e.g. in FIG. 10A), neighboring samples above (on the top of the) block being predicted (or current block) are used to generate the main reference side and top side is selected as the main side, otherwise neighboring samples to the left of a block being predicted are used to generate a main reference side and left side is selected as the main side. In summary, in step one, the main side is determined for a current block based on the intra-prediction mode of the current block. Based on the main side, the main reference side including the reference samples (some or all of which are) used for prediction of the current block is determined. As shown in e.g. FIG. 15A, main reference side is parallel to the main (block) side, but it may be e.g. longer than the block side. In other words, e.g., given an intra-prediction mode, for each the sample of the current block, the corresponding reference sample(s) among reference samples (e.g. main reference side samples) are also given.

2. Step two may consist in determining the maximum subpixel offset that is calculated by multiplying a length of non-main side by the maximum value from either Table 4 or Table 5 so that the result of this multiplication represents non-integer subpixel offset. Tables 4 and 5 provide exemplary values of subpixel offsets with respect to samples in the first line of samples of the current block (either the topmost row of samples, corresponding to the top side being selected as main side, or the leftmost column of samples corresponding to the left side being selected as main). Accordingly, the values shown in Tables 4 and 5 correspond to subpixel offsets per line of samples. Thus, a greatest offset that occurs in the prediction of the entire block is obtained by multiplying this per-line value with the length of the non-main side. Specifically in this example, the result should not be a multiple of 32, since the fixed-point resolution is 1/32 sample. If a multiplication of any per-line value, e.g. from Table 4 or 5, with the length of the non-main reference side, yields a multiple of 32 corresponding to an integer total value of the subpixel offset (i.e. an integer number of samples), this multiplication result is discarded. The non-main side is the side of the block (either the top side or the left side) that has not been selected in step one. Accordingly, the length of the non-main side is the width of the current block if the top side has been selected as the main side, and the length of the non-main side is the height of the current block if the left side has been selected as the main side.

3. Step three may consist in taking the integer part of the subpixel offset obtained in step two corresponding to the above-described multiplication result (i.e. by right-shifting by 5 in binary representation), summing it with the length of the main side (the block width or block length, respectively) and half of the length of interpolation filter, which results in the total value of the main reference side. Accordingly, the main reference side comprises a line of samples which is parallel and equal in length to the main reference side, extended by adjacent samples within the non-integer part of the subpixel offset and further adjacent samples within a half of the length of the interpolation filter. Only half of the length of the interpolation filter is required because the interpolation is performed over samples within the length of the inter part of the subpixel offset and a same amount of samples located beyond the length of the subpixel offset.

According to another embodiment of the present disclosure, reference samples being used to obtain values of predicted pixels are not adjacent to the block of predicted samples. Encoder may signal an offset value within a bitstream, so that this offset value indicates the distance between adjacent line of reference samples and the line of reference samples from which the values of predicted samples are derived.

Figure 24:
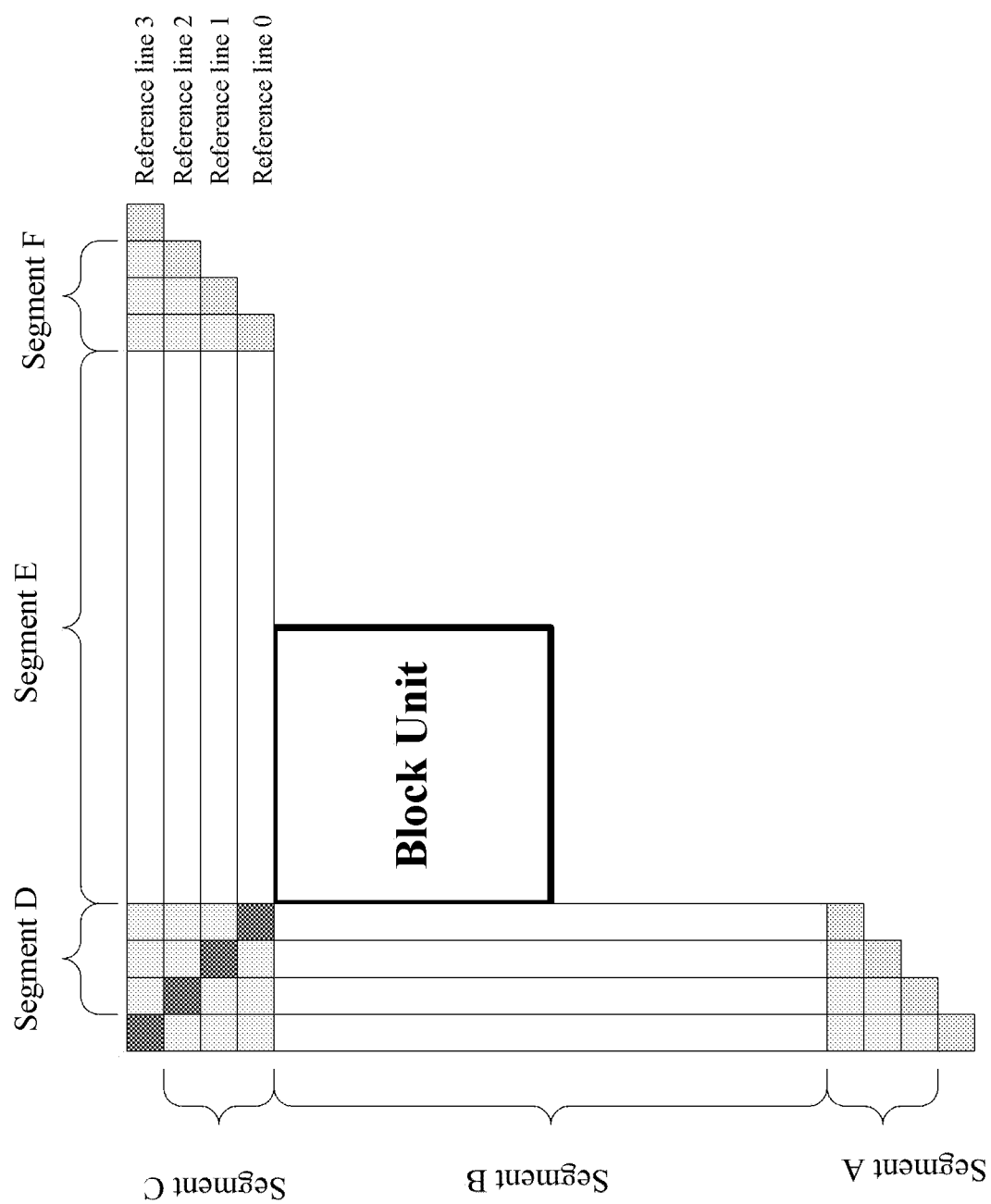
FIG. 24 shows another examples in which the possible position of reference samples' lines and corresponding values of ref_offset variable.

FIG. 24 represents the possible position of reference samples' lines and corresponding values of ref_offset variable.

Example of offsets' values being used in a particular implementation of a video codec (e.g. video encoder or decoder) is as follows:
- use adjacent line of reference samples (ref_offset=0, denoted by "Reference line 0" in FIG. 24);
- use first line (closest to the adjacent line) (ref_offset=1, denoted by "Reference line 1" in FIG. 24);
- use third line (ref_offset=3, denoted by "Reference line 3" in FIG. 24).

Variable "ref_offset" has the same meaning as variable "refIdx" used further. In other words, Variable "ref_offset" or the variable "refIdx" indicates reference line, for example, when ref_offset=0, it represents "reference line 0" (as shown in FIG. 24) is used.

Directional intra prediction mode specifies the value of subpixel offset between two adjacent lines of predicted samples (deltaPos). This value is represented by a fixed-point integer value having 5-bits precision. For example, deltaPos=32 means that the offset between two adjacent lines of predicted samples is exactly one sample.

If intra prediction mode is greater than DIA_IDX (mode #34), for the above-described example, the value of main reference side size is calculated as follows. Among a set of available (i.e. that encoder may indicate for the block of predicted samples) intra predicted modes, the mode that is greater than DIA_IDX and provides the greatest deltaPos value is considered. The value of the desired subpixel offset between reference samples or an interpolated sample position and a sample to be predicted is derived as follows: block height is summed up with ref_offset and multiplied by deltaPos value. If the result is divided by 32 with zero remainder, another greatest value of deltaPos as described above, but previously considered predicted modes are skipped when getting modes from the set of available intra predicted modes. Otherwise, the result of this multiplication is considered to be the greatest non-integer subpixel offset. An integer part of this offset is taken by shifting it right by 5 bits.

The size of the man reference side is obtained by summing up the integer part of the greatest non-integer subpixel offset, the width of the block of predicted samples and a half of the length of interpolation filter (as shown in FIG. 15A).

Otherwise, if intra prediction mode is lesser than DIA_IDX (mode #34), for the above-described example, the value of main reference side size is calculated as follows. Among a set of available (i.e. that encoder may indicate for the block of predicted samples) intra predicted modes, the mode that is lesser than DIA_IDX and provides the greatest deltaPos value is considered. The value of the desired subpixel offset is derived as follows: block width is summed up with ref_offset and multiplied by deltaPos value. If the result is divided by 32 with zero remainder, another greatest value of deltaPos as described above, but previously considered predicted modes are skipped when getting modes from the set of available intra predicted modes. Otherwise, the result of this multiplication is considered to be the greatest non-integer subpixel offset. An integer part of this offset is taken by shifting it right by 5 bits. The size of the man reference side is obtained by summing up the integer part of the greatest non-integer subpixel offset, height of the block of predicted samples, and a half of the length of interpolation filter.

FIGS. 15A, 15B, 15C to 18 show some examples of intra-predicting of a block from reference samples of the main reference side. For each row of samples of block of predicted samples 1120 fractional subpixel offset 1150 is determined. This offset may have integer or non-integer value depending on the difference between the selected directional intra prediction mode M and orthogonal intra prediction mode Mo (either HOR_IDX or VER_IDX, depending on which of those is closer to the selected intra prediction mode).

The state-of-the-art video coding methods and existing implementations of these methods takes advantage over the fact that in case of intra angular prediction the size of the main reference side is determined as doubled length of the corresponding block side. For example, in HEVC, if intra prediction mode is greater or equal than 34 (see FIG. 10A or 10B), the main reference side samples are taken from the top and top-right neighboring block, if these blocks are available, i.e. already reconstructed and not out of the processed slice. The total number of the neighboring samples used is set equal to doubled width of the block. Similarly, if intra prediction mode is less than 34 (see FIG. 10), the main reference side samples are taken from the left and bottom left neighboring block, the total number of the neighboring samples is set equal to doubled height of the block.

However, when applying subpixel interpolation filter, additional samples to the left and right edges of the main reference side are used. In order to maintain compliance with existing solutions, these additional samples are proposed to be obtained by padding main reference side to the left and right. Padding is performed by replicating first and last samples of the main reference side to the left and to the right side respectively. Denoting main reference side as ref, and its size as refS, the padding could be represented as the following assignment operations:

ref[−1]=p[0],
ref[refS+1]=p[refS].

In practice, usage of negative indexes could be avoided by applying a positive integer offset when referring to elements of the array. Particularly, this offset could be set equal to the number of elements left-padded to the main reference side.

Specific examples of how to perform right-padding and left-padding is given in the following two cases illustrated by FIG. 15B.

Right-padding case occurs, e.g., when M-Mo being equal to 22 (see Table 4) specifies subpixel offset equal to 60/32 for wide angle modes 72 and −6 (FIG. 10B). When aspect ratio of a block is 2 (i.e. for dimensions of predicted blocks equal to 4×8, 8×16, 16×32, 32×64, 8×4, 16×8, 32×16, 64×32), corresponding maximum subpixel offset value is calculated for the bottom-right predicted sample as $$\frac{60 \cdot S}{32},$$

S is a smaller side of the block.

Hence for a 8×4 block, the maximum subpixel offset will be equal to $$\frac{60 \cdot 4}{32} = 7\frac{16}{32},$$

i.e. maximum value of integer subpixel part of this offset is equal to 7. When applying 4-tap intra interpolation filter to obtain value of the bottom-right sample with coordinates x=7, y=3 reference samples with indices: x+7-1, x+7, x+7+1 and x+7+2 would be used. The rightmost sample position x+7+2=16, which means that one sample at the end of main reference side is padded by replicating reference sample with position x+7+1, because main reference side has 16 neighboring samples with indices 0 . . . 15.

The same steps are performed when Table 5 is in use for modes 71 and −5. Subpixel offset for this case is equal to 57/32, resulting in the maximum value of $$\frac{57 \cdot S}{32} = \frac{57 \cdot 4}{32} = 7\frac{4}{32}.$$

Case of left-padding occurs for angular modes 35 . . . 65 and 19 . . . 33, e.g. when subpixel offset is fractional and less than one sample. Corresponding subpixel offset value is calculated for the top-left predicted sample. According to Table 4 and Table 5, this offset falls within a range of $$\left[\frac{1}{32}, \frac{29}{32}\right]$$

corresponding to zero integer subsample offset. Applying 4-tap interpolation filter to calculate predicted sample with coordinates x=0, y=0 would require reference samples with indices: x−1, x, x+1 and x+2. The leftmost sample position x−1=−1. The sample at this position is padded by replicating reference sample with position x, because main reference side has 16 neighboring samples with indices 0 . . . 15.

From the examples above it follows, that for a block with aspect ratio main reference side is padded by half of the 4-tap filter length, i.e. two samples, one of which is added to the start (left edge) of the main reference side and the other one is added to the end (right edge) of the main reference side. For the case of 6-tap interpolation filtering, two samples should be added to the start and end of the main reference side following the above-described steps. Generally, if N-tap intra interpolation filter is used, main reference side is padded with N/2 samples, N/4 of which are padded to the left side and N/4 are padded to the right side, N is an even non-negative integer value.

Repeating above-describe steps for other block aspect ratios, the following offsets are obtained (see Table 6).

TABLE 6

Maximum subpixel offset for different block sizes and aspect ratio equal to 2

| Block dimension | Maximum subpixel offset | |
|---|---|---|
| | according to Table 4 (subpixel offset = $60/32$) | according to Table 5 (subpixel offset = $57/32$) |
| 4 × 8, 8 × 4 | $7^{16}/_{32}$ | $7^{4}/_{32}$ |
| 8 × 16, 16 × 8 | 15 | $14^{8}/_{32}$ |
| 16 × 32, 32 × 16 | 30 | $28^{16}/_{32}$ |
| 32 × 64, 64 × 32 | 60 | 57 |

From the values given in Table 6 it follows, that for wide-angular intra prediction modes:

When Table 4 is in use, in case of 4-tap interpolation filtering left-padding and right-padding operations are required for block sizes 4×8, 8×4, 8×16 and 16×8.

When Table 5 is in use, in case of 4-tap interpolation filtering left-padding and right-padding operations are required only for block sizes 4×8 and 8×4.

The details of the proposed method are described in Table 7 in the format of the specification. The above-described padding embodiment could be expressed as the following modification to the VVC draft (part 8.2.4.2.7):

TABLE 7

The values of the prediction samples predSamples[ x ][ y ], with x = 0..nTbW − 1, y = 0..nTbH − 1 are derived as follows:
If predModeIntra is greater than or equal to 34, the following ordered steps apply:
   1. The reference sample array ref[ x ] is specified as follows:
      The following applies:
         ref[ x ] = p[ −1 + x ][ −1 ], with x = 0..nTbW       (8-31)
      If intraPredAngle is less than 0, the main reference sample array is extended as follows:
         When (nTbH * intraPredAngle ) >> 5 is less than −1,
            ref[ x ] = p[ −1 ][ −1 + ( ( x * invAngle + 128 ) >> 8 ) ],
              with x = −1..( nTbH * intraPredAngle ) >> 5       (8-32)
            ref[ ( ( nTbH * intraPredAngle ) >> 5 ) −1 ] =
            ref[ ( nTbH * intraPredAngle ) >> 5 ) ]       (8-33)
            ref[ nTbW + 1 ] = ref[ nTbW ]       (8-34)
      Otherwise,
         ref[ x ] = p[ −1 + x ][ −1 ], with x = nTbW + 1..refW       (8-35)
         ref[ −1 ] = ref[ 0 ]       (8-36)
         ref[ refW + 1 ] = ref[ refW ]       (8-37)
Otherwise (predModeIntra is less than 34), the following ordered steps apply:
   The reference sample array ref[ x ] is specified as follows:
      The following applies:
         ref[ x ] = p[ −1 ][ −1 + x ], with x = 0..nTbH       (8-42)
      If intraPredAngle is less than 0, the main reference sample array is extended as follows:
         When ( nTbW * intraPredAngle ) >> 5 is less than −1,
            ref[ x ] = p[ −1 + ( ( x* invAngle + 128 ) >> 8 ) ][ −1 ],
              with x = −1..( nTbW * intraPredAngle ) >> 5       (8-43)
            ref[ ( ( nTbW * intraPredAngle ) >> 5 ) −1 ] =
            ref[ ( nTbW * intraPredAngle ) >> 5 ]       (8-44)
            ref[ nTbH + 1 ] = ref[ nTbH ]       (8-45)
      Otherwise,
         ref[ x ] = p[ −1 ][ −1 + x ], with x = nTbH + 1..refH       (8-46)
         ref[ −1 ] = ref[ 0 ]       (8-47)
         ref[ refH + 1 ] = ref[ refH ]       (8-48)

Tables 4 and 5 as described above represent the possible values of the said subpixel offset between two adjacent lines of predicted samples depending on the intra prediction mode.

Figure 19:
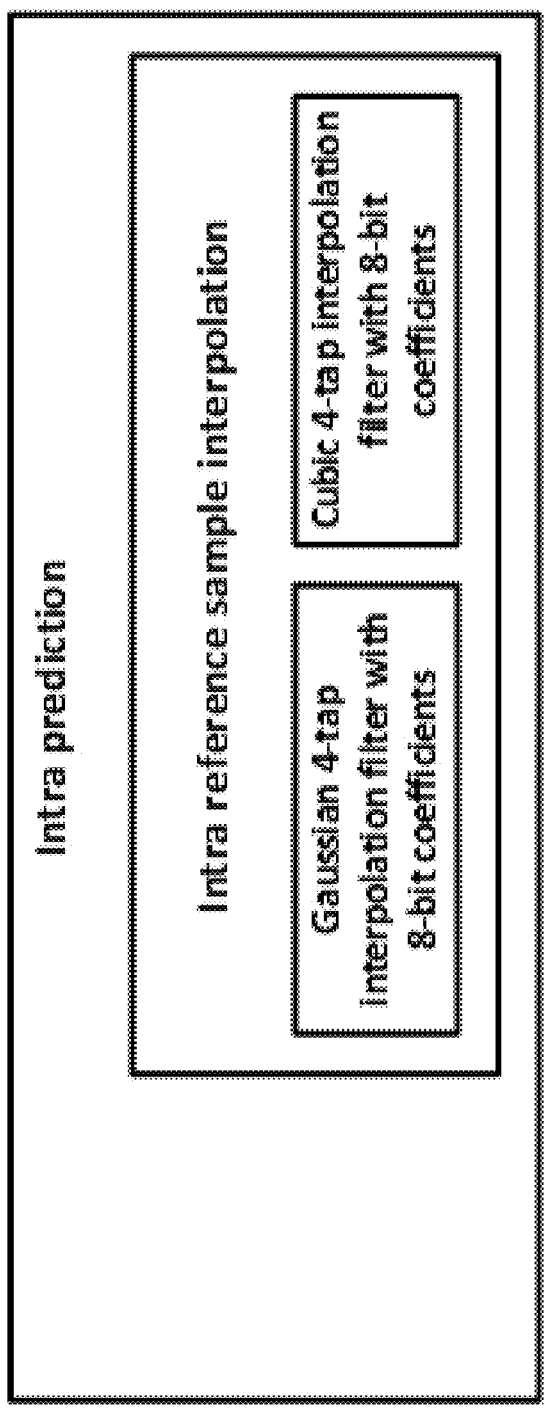
FIG. 19-21 shows Interpolation filters used in intra prediction.
Figure 20:
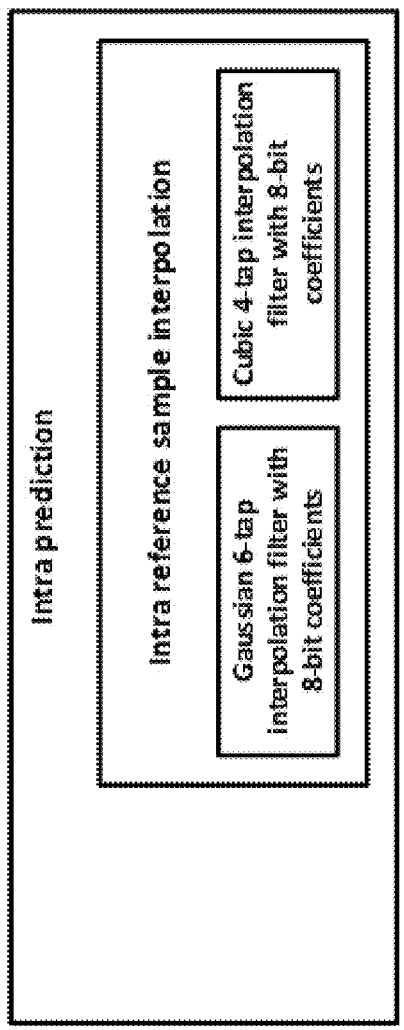
Figure 21:
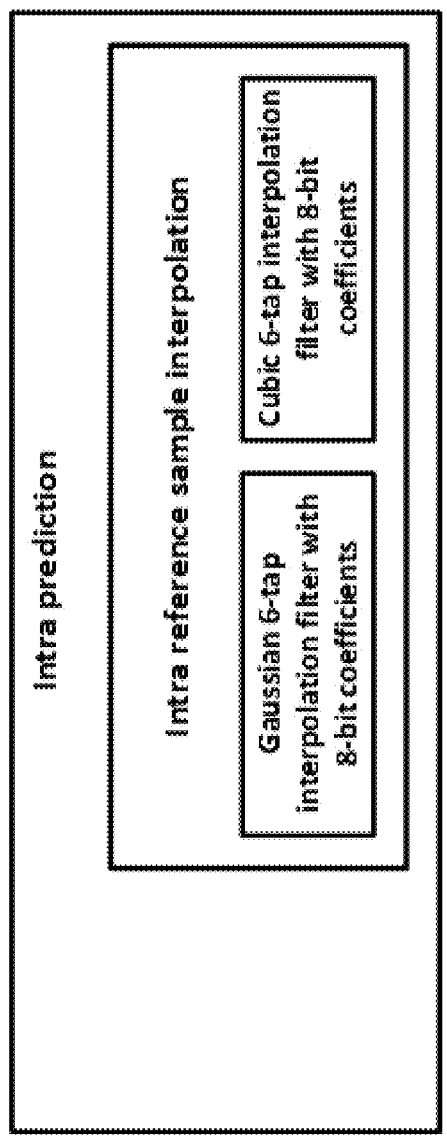

The state-of-the-art video coding solutions uses different interpolation filters in intra prediction. Particularly, FIGS. 19-21 show different examples of interpolation filters.

Figure 22:
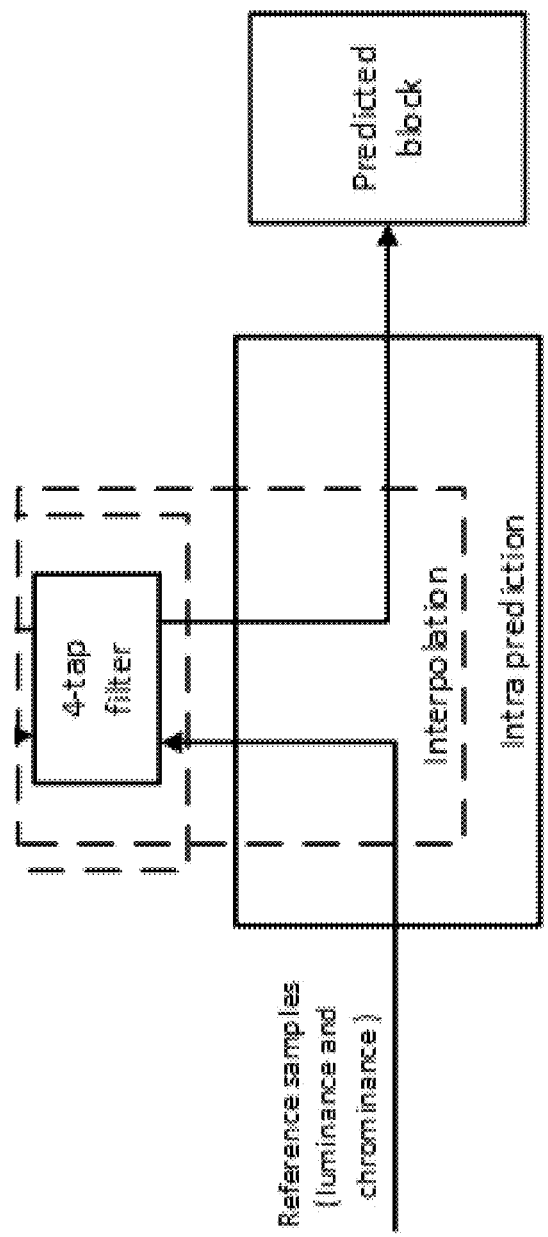
FIG. 22-23 shows Interpolation filters used in intra prediction configured to implement embodiments of the present disclosure.
Figure 23:
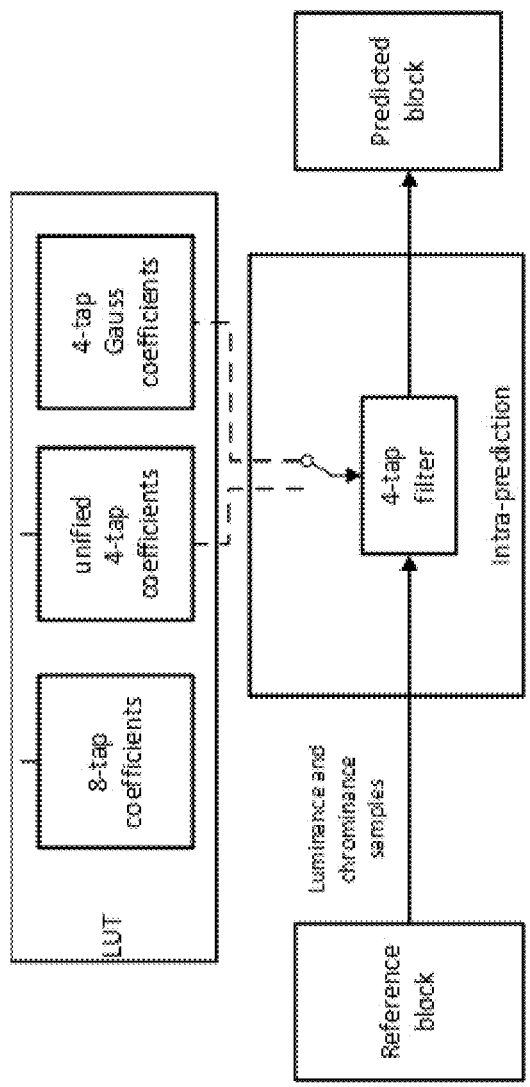

In the present disclosure, as illustrated in FIG. 22 or 23, intra-prediction process of a block is performed, wherein a subpixel interpolation filter is applied to luminance and chrominance reference samples during the intra-prediction process of the block; wherein the subpixel interpolation filter (such as a 4-tap filter) is selected on the basis of the subpixel offset between reference samples' positions and interpolated samples' positions; and wherein a size of the main reference side used in the intra-prediction process is determined according to the length of the subpixel interpolation filter and the intra-prediction mode that provides the greatest value of said subpixel offset. Memory requirements are determined by the greatest value of the subpixel offset. Memory requirements are determined by the greatest value of the subpixel offset.

Figure 15B:
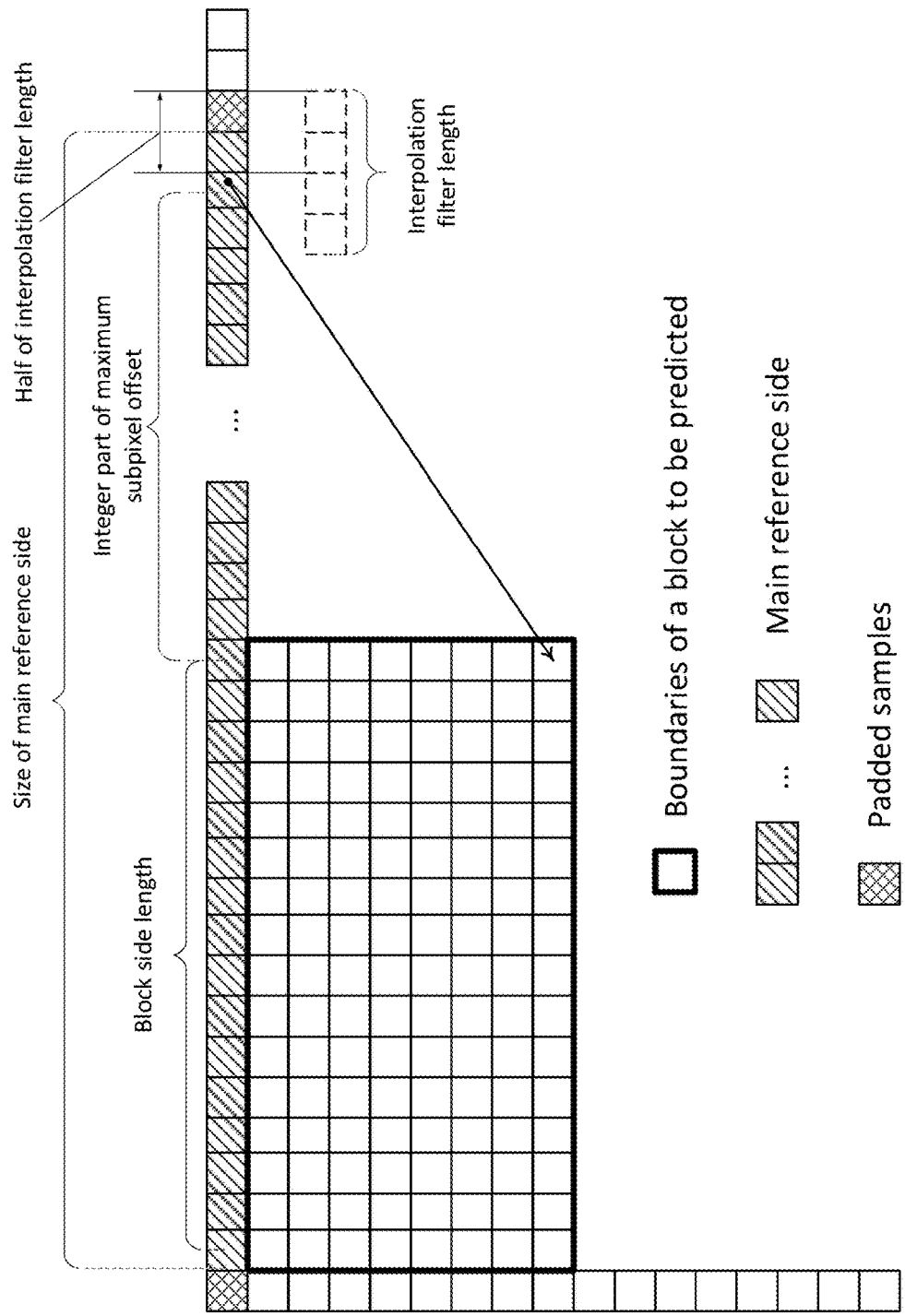

FIG. 15B illustrates the case when the top-left sample is not included into main reference side, but instead, is padded using leftmost sample that belongs to the main reference side. However, if predicted samples are calculated by applying a 2-tap subpixel interpolation filter (e.g. linear interpolation filter), top-left sample will not be referenced, and therefore no padding required in this case.

Figure 15C:
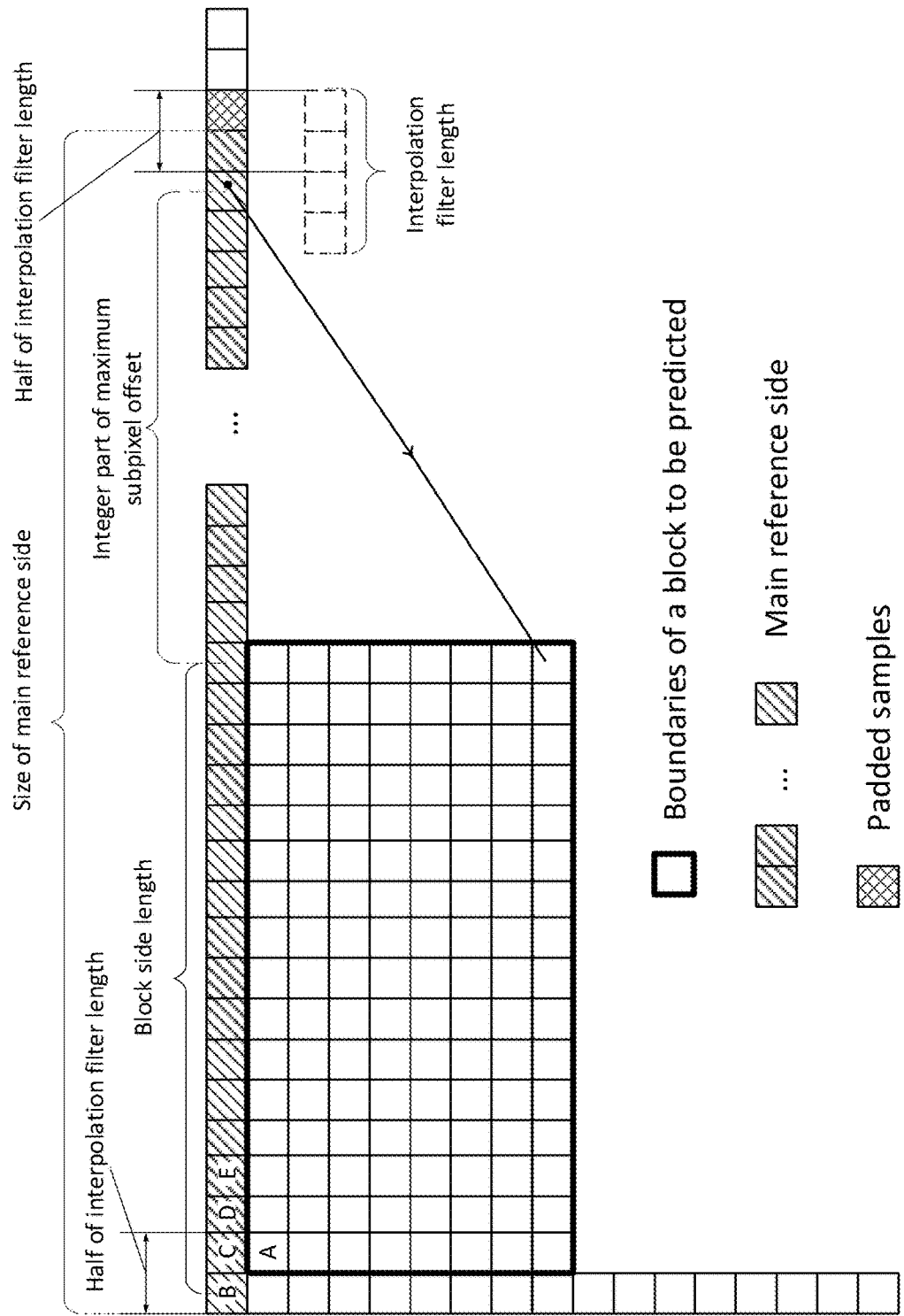
Figure 16:
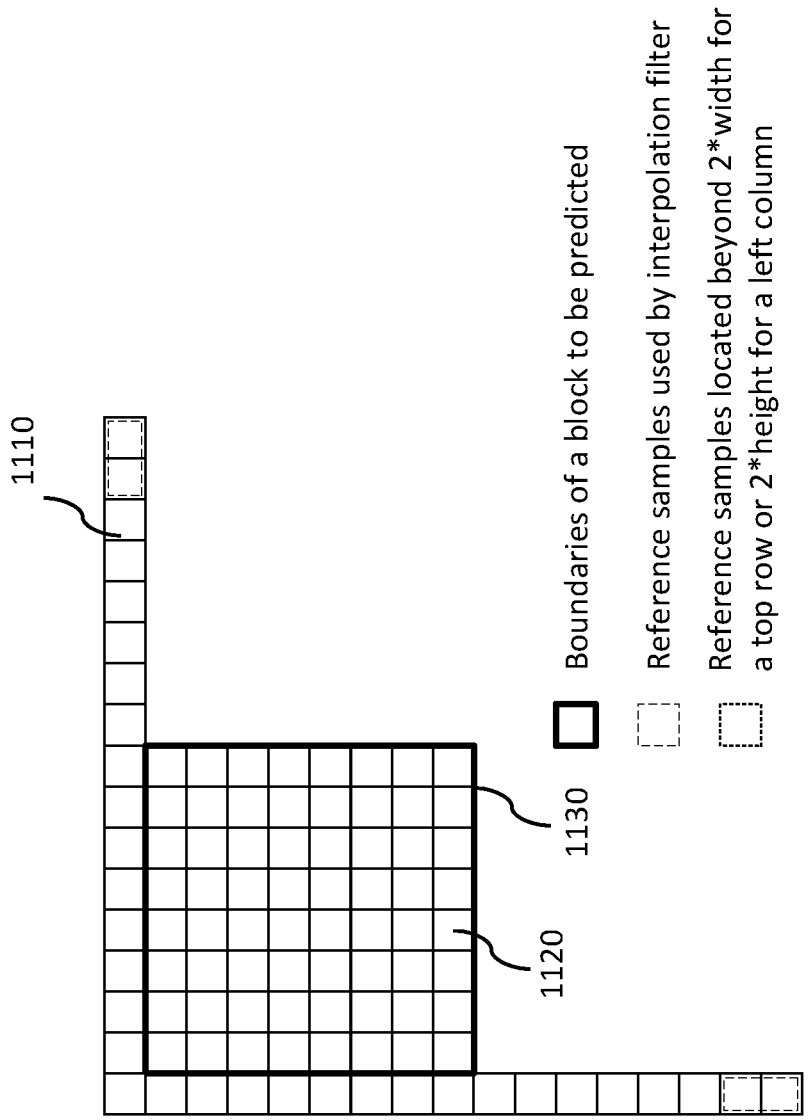
FIGS. 16-18 show some examples of intra-predicting of a block from reference samples of the main reference side.
Figure 17:
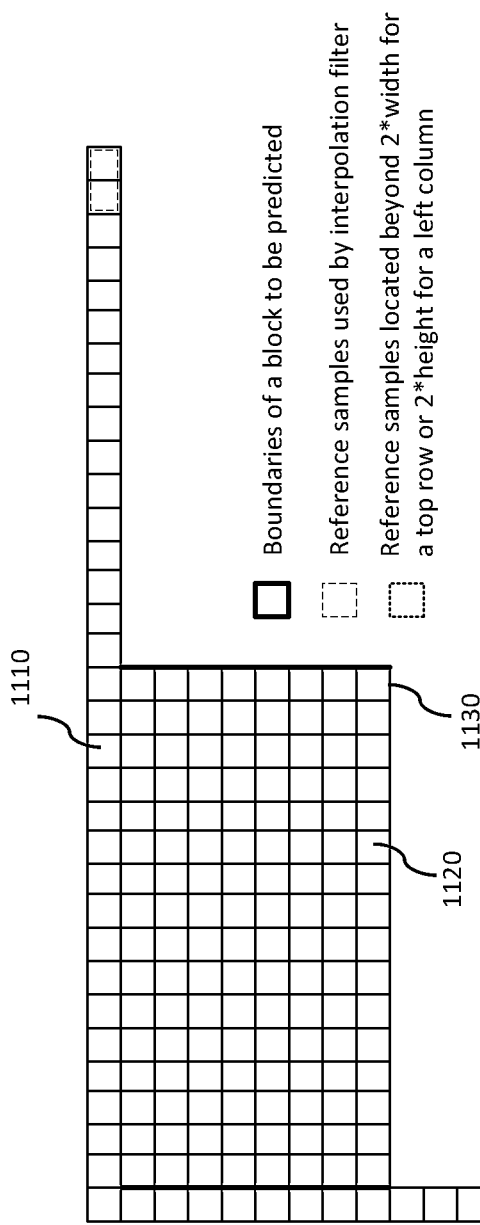
Figure 18:
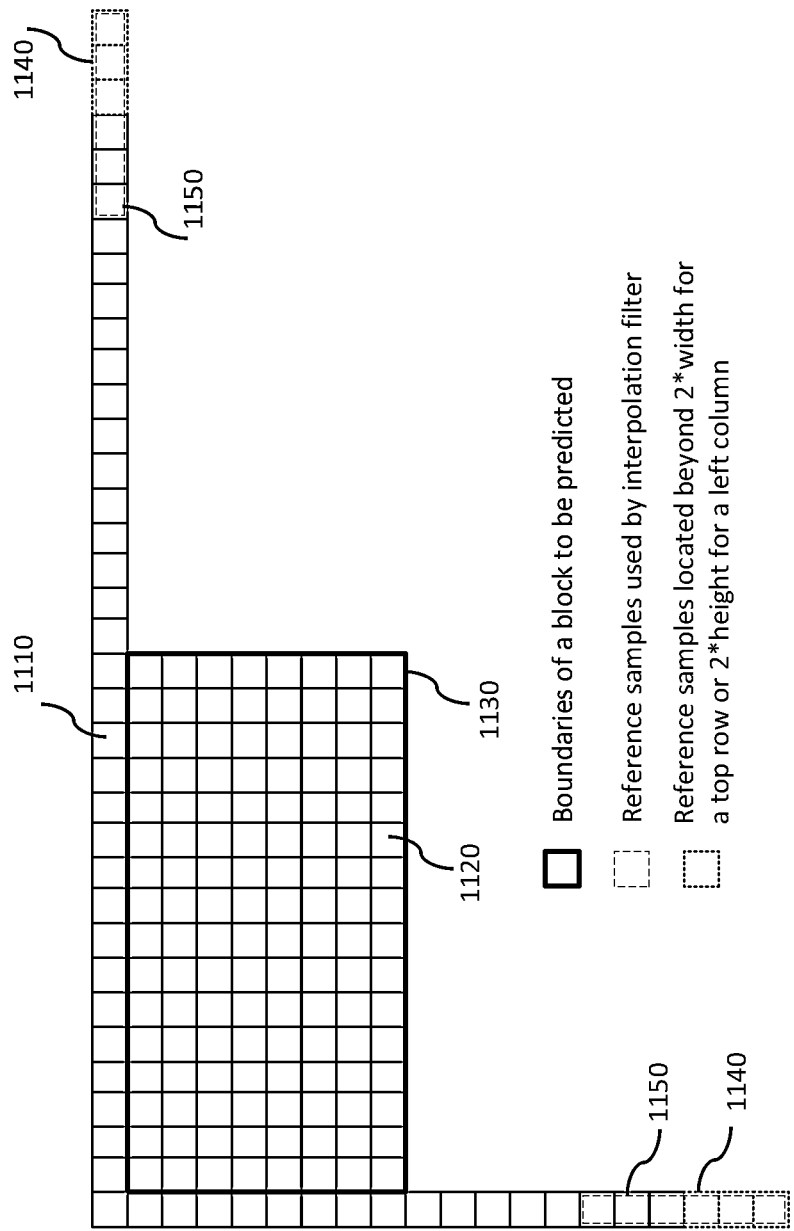

FIG. 15C illustrates the case when a 4-tap subpixel interpolation filter (e.g. Gauss, DCT-IF or Cubic) is used. It could be noticed, that in this case to calculate at least top-left predicted sample (marked as "A") four reference samples are required top-left sample (marked as "B"), and the next three samples (marked as "C", "D" and "E", respectively).

In this case two alternative methods are disclosed:
To pad a value of B using value of C
To use reconstructed sample of the neighboring block, just in the same manner as other samples (including "B", "C" and "D") of the main reference side are obtained, In this case, the size of the main reference side is determined as a sum of:
  the block main side length (i.e. block side length or a size of a side of the block of predicted samples),
  a half of the interpolation filter length minus one
  a maximum of the following two values M:
    the block main side length
    an integer part of the maximum subpixel offset plus a half of the interpolation filter length, or an integer part of the maximum subpixel offset plus a half of the interpolation filter length plus one (the addition of a one to this sum may or may not be included in view of memory considerations).

It is noted that "block main side", "Block side length", "the block main side length" and "a size of a side of the block of predicted samples" are the same concepts throughout the present disclosure.

It can be understood that the half of the interpolation filter length minus one is used to determined the size of the main reference side, thus it is allowed to extend casual main reference side to the left.

It can be understood that the maximum of the said two values M is used to determined the size of the main reference side, thus it is allowed to extend casual main reference side to the right.

In the description above, the block main side length is determined in accordance with intra prediction mode (FIG. 10B). If intra prediction mode is not less than the diagonal intra prediction mode (#34), the block main side length is the width of a block of predicted samples (i.e., a block to be predicted). Otherwise, the block main side length is the height of a block of predicted samples.

The value of subpixel offsets could be defined for angles of wider range (see Table 8).

Depending on the aspect ratio, different maximum and minimum value of intra prediction mode index (FIG. 10B) is allowed. Table 9 gives the example of this mapping.

TABLE 9

Dependency of max($|M-M_0|$) on the block aspect ration

| Aspect ratio \| log2(width)-log2(height) \| | max($|M-M_0|$) | Maximum subpixel offset per row (according to Table 8) |
|---|---|---|
| 0 | 16 | 32 |
| 1 | 22 | 64 |
| 2 | 26 | 128 |
| 3 | 28 | 256 |
| 4 | 30 | 512 |
| 5 | 31 | 1024 |

According to Table 9, for the maximum mode differences values$_{max(|M-M_t|)}$ integer subpixel offsets are used for interpolation (maximum subpixel offset per row is a multiple of 32), which means that predicted samples of the predicted block are calculated by copying values of corresponding reference samples and subsample interpolation filter is not applied.

Considering restrictions on max$_{(|M-M_0|)}$ of Table 9, and values of Table 8, the maximum subpixel offsets per row, that do not require interpolation is defined as follows (see Table 10).

TABLE 10

Dependency of the maximum subpixel offsets per row, that do not require interpolation on the block aspect ration

| Aspect ratio \| log2(width)-log2(height) \| | max($|M-M_0|$) | Maximum subpixel offset per row (according to Table 10) |
|---|---|---|
| 0 | 16 | 29 |
| 1 | 22 | 57 |
| 2 | 26 | 102 |
| 3 | 28 | 171 |
| 4 | 30 | 341 |
| 5 | 31 | 341 |

Using Table 10, the value of integer part of the maximum subpixel offset plus half of the interpolation filter length for a square 4×4 block could be calculated using the following steps:

Step 1. Block main side length (equal 4) is multiplied by 29 and the result is divided by 32 thus giving a value of 3;

Step 2. Half of the 4-tap interpolation filter length is 2, which is added to the value obtained at step 1, resulting in a value of 5

From the example above it could be observed that the resulting value is greater than the block main side length. In

TABLE 8

Dependency of subpixel offset on the modes difference for the first row of predicted samples (another example)

| $|M-M_o|$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Subpixel offset | 0 | 1 | 2 | 3 | 4 | 6 | 8 | 10 | 12 | 14 | 16 | 18 | 20 | 23 | 26 | 29 |

| $|M-M_o|$ | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| Subpixel offset | 32 | 35 | 39 | 45 | 51 | 57 | 64 | 73 | 85 | 102 | 128 | 171 | 256 | 341 | 512 | 1024 | this example, the size of the main reference side is set to 10, which is determined as a sum of
  the block main side length (equal to 4)
  a half of the interpolation filter length minus one (equal to 1)
  a maximum of the following two values M:
    the block main side length (equal to 4)
    integer part of the maximum subpixel offset plus half of the interpolation filter length (equal to 5), or integer part of the maximum subpixel offset plus a half of the interpolation filter length plus one (equal to 6) (the addition of a one to this sum may or may not be included in view of memory considerations).

The total number of reference samples included into the main reference side is greater than the block main side length doubled.

When the maximum of two values M is equal to the block main side length, right-padding is not performed. Otherwise, right-padding is applied to the reference samples with positions that are horizontally or vertically distant from the position of the top-left predicted sample (denoted as "A" in FIG. 15C) not less than 2*nTbS (nTbS denotes the block main side length). Right-padding is performed by assigning the value of the padded sample to the value of the last reference sample on the main block side that has a position within a range of 2*nTbS.

When a half of the interpolation filter length minus one is greater than zero, the value of sample "B" (shown in FIG. 15C) is obtained by either left-padding, or a corresponding reference sample could be obtained, just in the same way as reference samples "C", "D" and "E" are obtained.

The details of the proposed method are described in Table 11 in the format of the specification. Instead right-padding or left-padding, corresponding reconstructed neighboring reference sample could be used. The case when left padding is not used could be represented by the following part of the VVC specification (part 8.2):

2 samples in height could be calculated using the following steps (if the block main side length is width):
  Step 1. Block height (equal 2) is multiplied by 57 and the result is divided by 32 thus giving a value of 3;
  Step 2. Half of the 4-tap interpolation filter length is 2, which is added to the value obtained at step 1, resulting in a value of 5

The rest of the steps to calculate the total number of reference samples included into the main reference side are the same as for the case of a square block.

Using Table 10 and block dimensions from Table 6, it could be noticed that the maximum number of reference samples subject to left-padding or right-padding is 2.

If the block to be predicted is not adjacent with the neighboring reconstructed reference samples used in intra prediction process (reference line could be selected as shown in FIG. 24), the embodiment described below is applicable.

The first step is to define the aspect ratios of a block depending on the main side of the predicted block according to the intra prediction mode. If a top side of the block is selected to be the main side, then aspect ratio $R_a$ (denoted in the VVC specification as "whRatio") is set equal to the result of integer division of the width of the block (denoted in the VVC specification as "nTbW") by the height of the block (denoted in the VVC specification as "nTbH"). Otherwise, in case when the main side is the left side of the predicted block, aspect ratio $R_a$ (denoted in the VVC specification as "hwRatio") is set equal to the result of integer division of the height of the block by the width of the block. In both cases, if the value of Ra is less than 1 (i.e., a numerator value of the integer division operator is less than a value of denominator) it is set equal to 1.

The second step is to add a part of reference samples (denoted as "p" in the VVC specification) to the main reference side. Depending on the value of refIdx, either adjacent or non-adjacent reference samples are used. Ref-

TABLE 11

The values of the prediction samples predSamples[ x ][ y ], with x = 0..nTbW − 1, y = 0..nTbH − 1 are derived as follows:
If predModeIntra is greater than or equal to 34, the following ordered steps apply:
  The reference sample array ref[ x ] is specified as follows:
    The following applies:
      ref[ x ] = p[ −1 + x ][ −1 ], with x = 0..nTbW
    If intraPredAngle is less than 0, the main reference sample array is extended as follows:
      When ( nTbH * intraPredAngle ) >> 5 is less than −1,
        ref[ x ] = p[ −1 ][ −1 + ( ( x * invAngle + 128 ) >> 8 ) ],
          with x = −1..( nTbH * intraPredAngle ) >> 5
        ref[ ( ( nTbH * intraPredAngle ) >> 5 ) −1 ] = ref[ ( nTbH * intraPredAngle ) >> 5 ) ]
        ref[ nTbW + 1 ] = ref[ nTbW ]
      Otherwise,
        ref[ x ] = p[ −1 + x ][ −1 ], with x = nTbW + 1..refW
        ref[ refW + 1 ] = ref[ refW ]
  Otherwise (predModeIntra is less than 34), the following ordered steps apply:
  1. The reference sample array ref[ x ] is specified as follows:
    The following applies:
      ref[ x ] = p[ −1 ][ −1 + x ], with x = 0..nTbH
    If intraPredAngle is less than 0, the main reference sample array is extended as follows:
      When ( nTbW * intraPredAngle ) >> 5 is less than −1,
        ref[ x ] = p[ −1 + ( ( x * invAngle + 128 ) >> 8 ) ][ −1 ],
          with x = −1..( nTbW * intraPredAngle ) >> 5
        ref[ ( ( nTbW * intraPredAngle ) >> 5 ) −1 ] = ref[ (nTbW * intraPredAngle ) >> 5 ]
        ref[ nTbH + 1 ] = ref[ nTbH ]
      Otherwise,
        ref[ x ] = p[ −1 ][ −1 + x ], with x = nTbH + 1..refH
        ref[ refH + 1 ] = ref[ refH ]

Similarly, using Table 10, the value of integer part of the maximum subpixel offset plus half of the interpolation filter length for a non-square block having 4 samples in width and 2 samples in height could be calculated using the following erence samples that are added to the main reference side are selected with an offset relative to the main block side in the direction of the orientation of the main side. Specifically, if the main side is the top side of the predicted block, the offset is horizontal and is defined as −refIdx samples. If the main side is the left side of the predicted block, the offset is vertical and is defined as −refIdx samples. At this step, nTbS+1 samples are added (nTbS denotes main side length), starting from top-left reference sample (denoted as "B" sample in FIG. 15C) plus the value of the above-described offset. It is noted that the explanation or definition of RefIdx is presented in the present disclosure in the combination with FIG. 24.

The next steps performed depend on whether the subpixel offset (denoted in VVC specification as "intraPredAngle") is positive or negative. Zero value of the subpixel offset corresponds to horizontal intra prediction mode (in case when main side of the block is the left block side) or vertical intra prediction mode (in case when main side of the block is the top block side).

If the subpixel offset is negative (e.g. step 3, negative subpixel offset), at the third step the main reference side is extended to the left with the reference samples corresponding to the non-main side. Non-main side is the side that is not selected as the main side, i.e. when intra prediction mode is reference samples corresponding to the non-main side are selected according to the process disclosed in the second step, with the difference that non-main side is used instead of the main side. When this step is complete, the main reference side is extended from the start to the end using its first and last samples, respectively, in other words, in step 3, negative subpixel offset padding is performed.

If the subpixel offset is positive (e.g. step 3, positive subpixel offset), at the third step the main reference side is extended to the right by additional nTbS samples in the same way as described in step 2. If the value of refIdx is greater than 0 (reference samples are not adjacent to the block to be predicted), right-padding is performed. The number of right-padded samples is equal to the value of the aspect ratio Ra calculated at the first step multiplied by refIdx value. In case four tap filter is in use, the number of right-padded samples is increased by 1.

The details of the proposed method are described in Table 12 in the format of the specification. VVC specification modification for this embodiment could be as follows (refW is set to nTbS−1):

TABLE 12

The values of the prediction samples predSamples[ x ][ y ], with
x = 0..nTbW − 1, y = 0..nTbH − 1 are derived as follows:
Block width-to-height and height-to-width ratios are determined as follows:
    whRatio = max(1, nTbW / nTbH), where nTbW / nTbH is an integer division
    hwRatio = max(1, nTbH / nTbW), where nTbH / nTbW is an integer division    //Step 1
If predModeIntra is greater than or equal to 34, the following ordered steps apply:
    1. The reference sample array ref[ x ] is specified as follows:
        The following applies:
            ref[ x ] = p[ −1 − refIdx + x ][ −1 − refIdx], with x = 0..nTbW    //Step2
        If intraPredAngle is less than 0, the main reference sample array is extended as follows:
            When ( nTbH * intraPredAngle) >> 5 is less than −1,
                ref[ x ] = p[ −1 − refIdx ][ −1 − refIdx + ( ( x * invAngle + 128 ) >> 8 ) ],
                    with x = −1..( nTbH * intraPredAngle) >> 5    // Step 3, negative subpixel offset
                ref[ ( ( nTbH * intraPredAngle ) >> 5 ) −1 ] = ref[ ( nTbH * intraPredAngle ) >> 5 ) ]
                ref[ nTbW + 1 ] = ref[ nTbW ]    //Step3, negative subpixel offset padding
        Otherwise,    //Step 3, positive subpixel offset
            ref[ x ] = p[ −1 − refIdx + x ][ −1 − refIdx ], with x = nTbW + 1..refW
            - If refIdx not equal to 0, the following padding is performed with x = 1..whRatio*refIdx:
                - ref[ refW + refIdx + x ] = ref[ refW + refIdx]
            ref[ refW + (whRatio + 1)*refIdx + 1 ] = ref[ refW + (whRatio + 1)*refIdx ]
            // Additional right-padding by 1
Otherwise (predModeIntra is less than 34), the following ordered steps apply:
// Replication of the same process for
left-side intra prediction (i.e. when main block side is the left side)
    1. The reference sample array ref[ x ] is specified as follows:
        The following applies:
            ref[ x ] = p[ −1 − refIdx ][ −1 − refIdx + x ], with x = 0..nTbH + refIdx
        If intraPredAngle is less than 0, the main reference sample array is extended as follows:
            When ( nTbW * intraPredAngle) >> 5 is less than −1,
                ref[ x ] = p[ −1 − refIdx + ( ( x * invAngle + 128 ) >> 8 ) ][ −1 − refIdx ],
                    with x = −1..( nTbW * intraPredAngle ) >> 5
                ref[ ( ( nTbW * intraPredAngle ) >> 5 ) −1 ] = ref[ ( nTbW * intraPredAngle ) >> 5 ]
            ref[ nTbH + 1 ] = ref[ nTbH ]
        Otherwise,
            ref[ x ] = p[ −1 − refIdx ][ −1 − refIdx + x ], with x = nTbH + 1..refH
            If refIdx not equal to 0, the following padding is performed with x = 1..hwRatio*refIdx:
                ref[ refH + refIdx + x ] = ref[ refH + refIdx ]
            ref[ refH + (hwRatio + 1)*refIdx + 1 ] = ref[ refH + (hwRatio + 1)*refIdx ]

greater or equal to 34 (FIG. 10B), non-main side is the left side of the block to be predicted and otherwise, non-main side is the left side of the block. Extension is performed as it is shown in FIG. 7, and the explanation of this process could be found in the relevant descriptions to FIG. 7. The above-described part of VVC specification is also applicable for the case when at the third step for positive values of subpixel offset main reference side is left-padded by 1 sample: The details of the proposed method are described in Table 13 in the format of the specification.

TABLE 13

The values of the prediction samples predSamples[ x ][y ], with x = 0..nTbW − 1, y = 0..nTbH − 1 are derived as follows:
- Block width-to-height and height-to-width ratios are determined as follows:
  - whRatio = max(1, nTbW / nTbH ), where nTbW / nTbH is an integer division
  - hwRatio = max(1, nTbH / nTbW), where nTbH / nTbW is an integer division
- If predModeIntra is greater than or equal to 34, the following ordered steps apply:
    1. The reference sample array ref[ x ] is specified as follows:
       The following applies:
           ref[ x ] = p[ −1 − refIdx + x ][ −1 − refIdx ], with x = 0..nTbW
       If intraPredAngle is less than 0, the main reference sample array is extended as follows:
           When ( nTbH * intraPredAngle ) >> 5 is less than −1,
               ref[ x ] = p[ −1 − refIdx ][ −1 − refIdx + ( ( x * invAngle + 128 ) >> 8 ) ],
                   with x = −1..( nTbH * intraPredAngle) >> 5
           ref[ ( ( nTbH * intraPredAngle ) >> 5 ) −1 ] = ref[ ( nTbH * intraPredAngle ) >> 5 ) ]
           ref[ nTbW + 1 ] = ref[ nTbW ]
       Otherwise,
           ref[ x ] = p[ −1 − refIdx + x ][ −1 − refIdx], with x = nTbW + 1..refW
       - If refIdx not equal to 0, the following padding is performed with x = 1..whRatio*refIdx:
           - ref[ refW + refIdx + x ] = ref[ refW + refIdx ]
       ref [−1 ] = ref[ 0 ]
       ref[ refW + (whRatio + 1)*refIdx + 1 ] = ref[ refW + (whRatio + 1)*refIdx ]
...
Otherwise (predModeIntra is less than 34), the following ordered steps apply:
    1. The reference sample array ref[ x ] is specified as follows:
       The following applies:
           ref[ x ] = p[ −1 − refIdx ][ −1 − refIdx + x ], with x = 0..nTbH + refIdx
       If intraPredAngle is less than 0, the main reference sample array is extended as follows:
           When ( nTbW * intraPredAngle ) >> 5 is less than −1,
               ref[ x ] = p[ −1 − refIdx + ( ( x * invAngle + 128 ) >> 8 ) ][ −1 − refIdx ],
                   with x = −1..( nTbW * intraPredAngle ) >> 5
           ref[ ( ( nTbW * intraPredAngle ) >> 5 ) −1 ] = ref[ (nTbW * intraPredAngle ) >> 5 ]
           ref[ nTbH + 1 ] = ref[ nTbH ]
       Otherwise,
           ref[ x ] = p[ −1 − refIdx ][ −1 − refIdx + x ], with x = nTbH + 1..refH
       - If refIdx not equal to 0, the following padding is performed with x = 1..hwRatio*refIdx:
           - ref[ refH + refIdx + x ] = ref[ refH + refIdx]
       ref [−1 ] = ref[ 0 ]
       ref[ refH + (hwRatio + 1)*refIdx + 1 ] = ref[ refH + (hwRatio + 1)*refIdx ]

Figure 25:
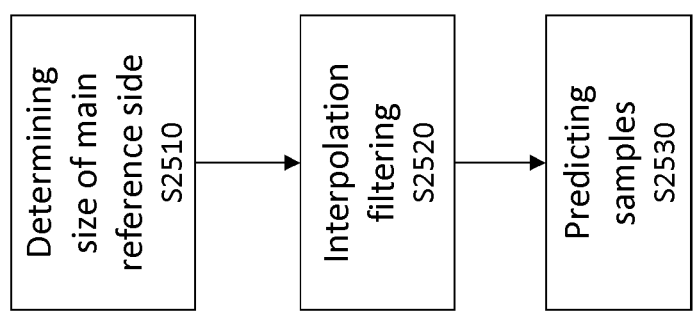
FIG. 25 is a flow chart showing an intra-prediction method.

The present disclosure provides an intra-prediction method for predicting a current block included in a picture, such as a video frame. Method steps of the intra-prediction method are shown in FIG. 25. The current block is the aforementioned block comprising samples, e.g. luminance samples or chrominance samples, to be predicted (or "predicted samples" or "prediction samples"). The method includes a step of determining S2510 a size of a main reference side based on an intra-prediction mode that provides, among available intra-prediction modes (e.g. as shown in FIGS. 10-11), a greatest non-integer value of a subpixel offset and a size (or length) of an interpolation filter. The subpixel offset is an offset between a sample (or "target sample") in the current block to be predicted and a reference sample (or reference sample position) based on which the sample in the current block is predicted. An offset may be associated with an angular prediction mode if the reference samples include samples which are not directly or straight above (e.g. modes having numbers equal to or grater than a diagonal mode) or left (e.g. modes having numbers equal to or smaller than a diagonal mode) of the current block, but include samples which are offset or shifted with respect to the position of the current block. Since not all modes point to integer reference sample positions, the offset has a subpixel resolution, and this subpixel offset may take a non-integer value and have an integer part plus a non-integer part. In the case of a non-integer value of the subpixel offset, interpolation between reference samples is performed. Thus, the offset is an offset between a position of the sample to be predicted and an interpolated reference sample position. The greatest non-integer value may be the greatest non-integer value (integer part plus non-integer part) with respect to any sample in the current block. For instance, as shown in FIGS. 15A-C, the target sample associated with the greatest non-integer subpixel offset may be the bottom-right sample in the current block. It should be noted that an intra-prediction mode that provides an integer-value of the offset which is greater that the greatest non-integer value of the subpixel offset is disregarded.

Possible sizes (or lengths) of the interpolation filter include four (e.g. the filter being a four-tap filter) or 6 (e.g. the filter being a six-tap filter).

The method further includes the steps of applying S2520 the interpolation filter on the on the reference samples included in the main reference side, and predicting S2530 the target samples included in the current block based on the filtered reference samples.

Figure 26:
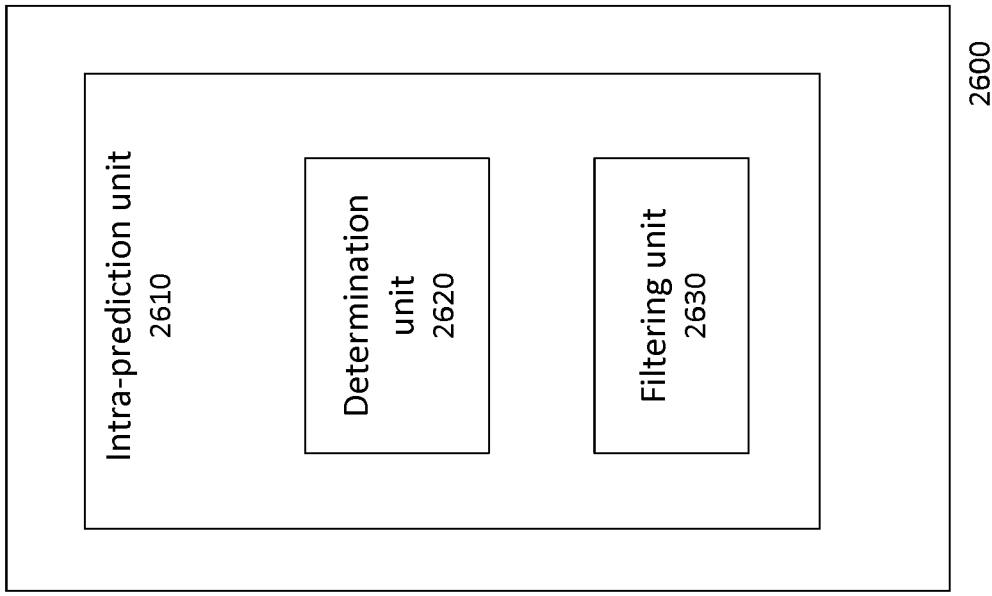
FIG. 26 is a block diagram showing an intra-prediction apparatus.

In correspondence with the method shown in FIG. 26, also provided is an apparatus 2600 for intra-prediction of a current block included in a picture. The apparatus 2600 is shown in FIG. 26 and may be included in the video encoder shown in FIG. 2 or video decoder shown in FIG. 3. In an example, the apparatus 2600 may be corresponding to the intra prediction unit 254 in FIG. 2. In another example, the apparatus 2600 may be corresponding to the intra prediction unit 354 in FIG. 3.

Apparatus 2600 comprises an intra-prediction unit 2610 configured to predict target samples included in the current block based on filtered reference samples. The intra-prediction unit 2610 may be intra-prediction unit 254 shown in FIG. 2 or intra-prediction unit 354 shown in FIG. 3. Intra-prediction unit 2610 comprises a determination unit 2620 (or "main reference size determination unit") configured to determine a size of a main reference side used in the intra-prediction. In particular, the size is determined based on: an intra-prediction mode that provides, (among available intra-prediction modes) a greatest non-integer value of a subpixel offset between a target sample (among the target samples) in the current block and a reference sample (referred to below as "subject reference sample") used for predicting said target sample in the current block, and based on a size of an interpolation filter to be applied on the reference samples included in the main reference side. The target sample is any sample of the block to be predicted. The subject reference sample is one of reference samples of the main reference side.

Intra-prediction unit 2610 further comprises a filtering unit configured to apply an interpolation filter on the reference samples included in the main reference side to obtain the filtered reference samples.

To sum up, Memory requirements are determined by the greatest value of the subpixel offset. Accordingly, by determining a size of the main reference side in accordance with the present disclosure, the disclosure facilitates providing memory efficiency in video coding using intra-prediction. In particular, memory (buffer) used by the encoder and/or decoder for performing intra-prediction may be allocated in an efficient way according to the determined size of the main reference side. This is firstly because the size of the main reference side determined according to the present disclosure includes all reference samples to be used for predicting the current block. Consequently, no accesses to further samples are necessary to perform the intra prediction. Secondly, it is not necessary to all already processed samples of the adjacent blocks, but rather, the memory size may be allocated specifically for those reference samples belonging to the main reference side, i.e. specifically to the size determined.

Following is an explanation of the applications of the encoding method as well as the decoding method as shown in the above-mentioned embodiments, and a system using them.

Figure 27:
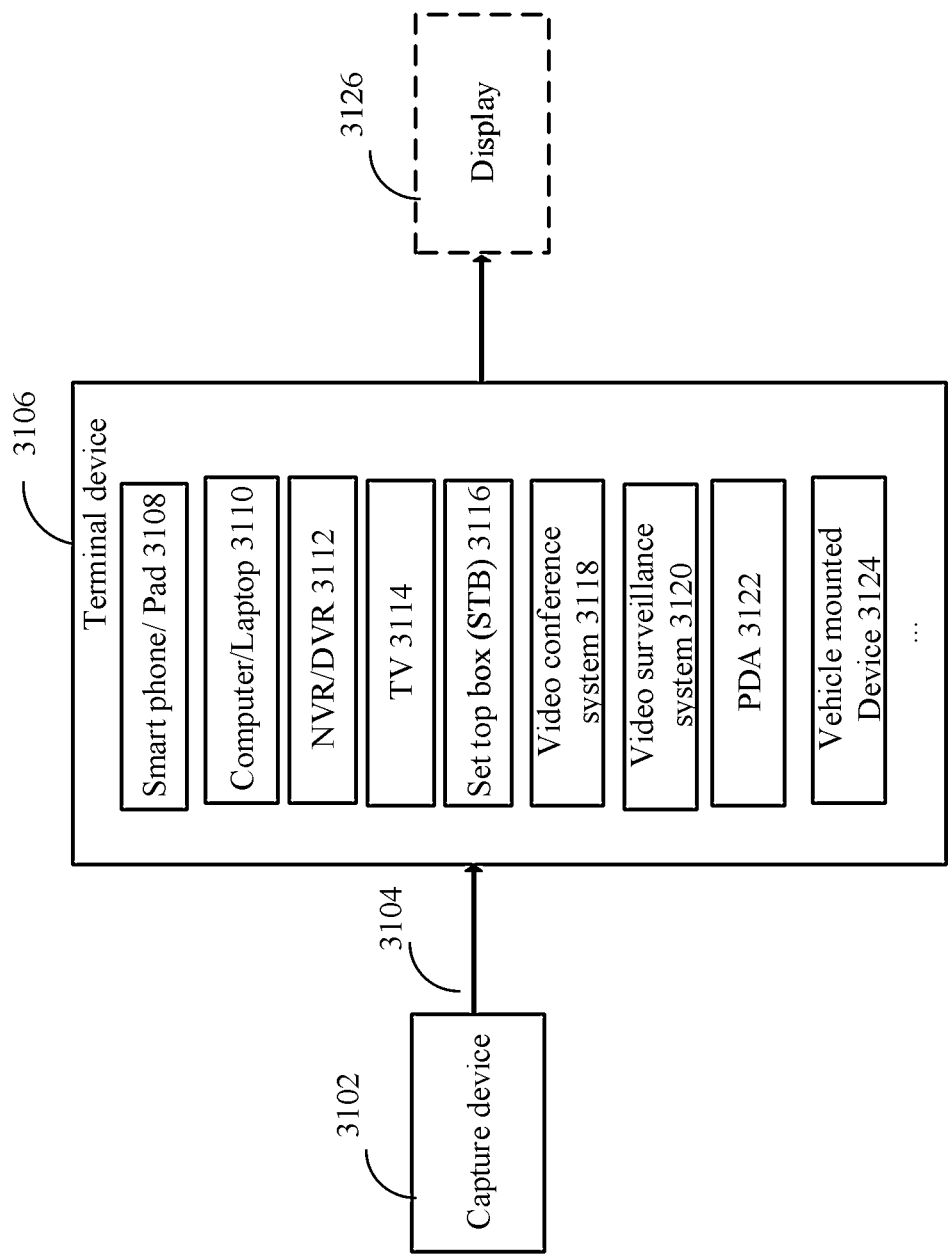
FIG. 27 is a block diagram showing an example structure of a content supply system which provides a content delivery service.

FIG. 27 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 28:
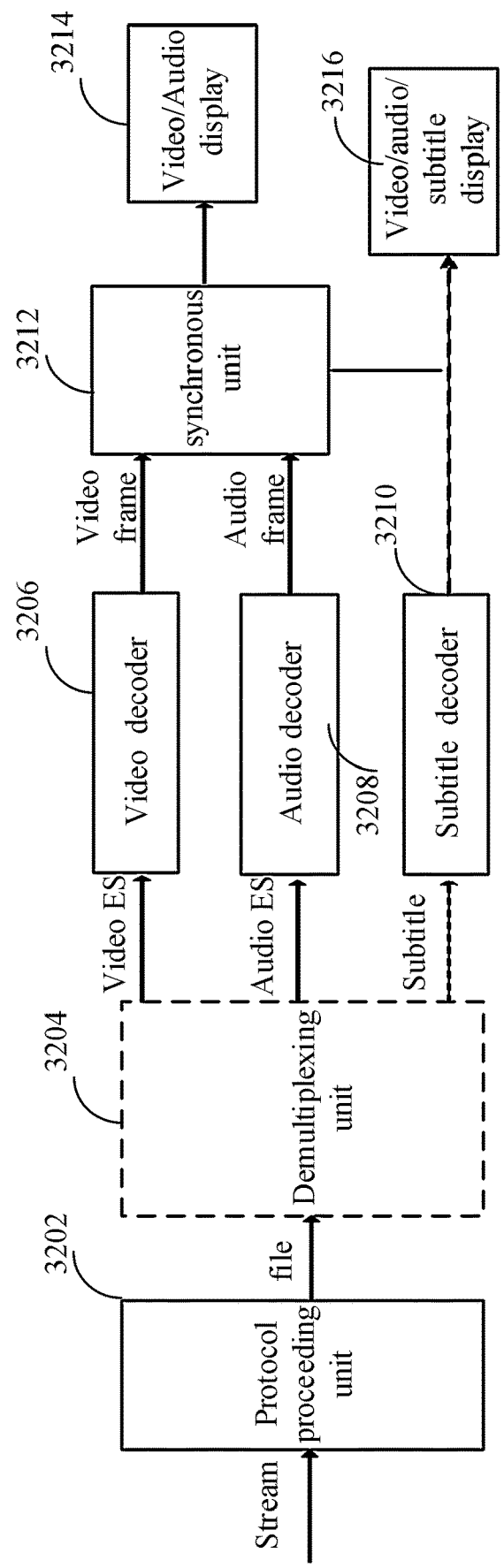
FIG. 28 is a block diagram showing an example of a terminal device.

FIG. 28 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:
1. A video data coding device, comprising:
a memory containing instructions; and
a processor in communication with the memory and upon execution of the instructions, is configured to:
perform an intra-prediction process of a block comprising samples to be predicted, wherein an interpolation filter is applied to reference samples of the block during the intra-prediction process of the block,
wherein the interpolation filter is selected based on a subpixel offset between the reference samples and the samples to be predicted,
wherein a size of a main reference side used in the intra-prediction process is determined according to a length of the interpolation filter and an intra-prediction mode that provides, out of a set of available intra-prediction modes, a greatest non-integer value of the subpixel offset, and wherein the main reference side comprises the reference samples, and
wherein the size of the main reference side is determined as a sum of:
an integer part of the greatest non-integer value of the subpixel offset,
a size of a side of the block, and
a half of the length of the interpolation filter.

2. The video data coding device of claim 1, wherein
the side of the block is a width of the block if an intra prediction mode is greater than a vertical intra prediction mode, VER_IDX;
or
the side of the block is a height of the block if the intra prediction mode is lesser than a horizontal intra prediction mode, HOR_IDX.

3. The video data coding device of claim 1, wherein, in the main reference side, values of reference samples with positions greater than a doubled size of the side of the block are set to be equal to a value of a sample located at the doubled size of the size of the side of the block.

4. The video data coding device of claim 1, wherein padding is performed by replicating a value of first reference sample and/or a value of last reference sample of the main reference side to a value of left and/or to a value of right of the main reference side respectively, in particular as follows: denoting the main reference side as ref, and the size of the main reference side as refS, the padding is represented as:
ref[−1]=p[0], and/or
ref[refS+1]=p[refS],
wherein ref[−1] represents the value of the left of the main reference side,
p[0] represents the value of the first reference sample of the main reference side,
ref[refS+1] represents the value of the right of the main reference side, and
p[refS] represents the value of the last reference sample of the main reference side.

5. The video data coding device of claim 1, wherein the interpolation filter used in the intra-prediction process is a finite impulse response filter and coefficients of the interpolation filter are fetched from a look-up table.

6. The video data coding device of claim 5, wherein coefficients, $c_0$, $c_1$, $c_2$, and $c_3$, of the interpolation filter depend on a non-integer part of the subpixel offset as follows:

| Non-integer part of the subpixel offset | $c_0$ | $c_1$ | $c_2$ | $c_3$ |
| --- | --- | --- | --- | --- |
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein non-integer part of the subpixel offset column is defined in 1/32 subpixel resolution.

7. The video data coding device of claim 5, wherein coefficients, $c_0$, $c_1$, $c_2$, and $c_3$, of the interpolation filter depend on a non-integer part of the subpixel offset as follows:

| Non-integer part of the subpixel offset | $c_0$ | $c_1$ | $c_2$ | $c_3$ |
| --- | --- | --- | --- | --- |
| 0 (integer) | 16 | 32 | 16 | 0 |
| 1 | 15 | 29 | 17 | 3 |
| 2 | 15 | 29 | 17 | 3 |
| 3 | 14 | 29 | 18 | 3 |
| 4 | 13 | 29 | 18 | 4 |
| 5 | 13 | 28 | 19 | 4 |
| 6 | 13 | 28 | 19 | 4 |
| 7 | 12 | 28 | 20 | 4 |
| 8 | 11 | 28 | 20 | 5 |
| 9 | 11 | 27 | 21 | 5 |
| 10 | 10 | 27 | 22 | 5 |
| 11 | 9 | 27 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 8 | 24 | 24 | 8 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 27 | 9 |
| 22 | 5 | 22 | 27 | 10 |
| 23 | 5 | 21 | 27 | 11 |
| 24 | 5 | 20 | 28 | 11 |
| 25 | 4 | 20 | 28 | 12 |
| 26 | 4 | 19 | 28 | 13 |
| 27 | 4 | 19 | 28 | 13 |
| 28 | 4 | 18 | 29 | 13 |
| 29 | 3 | 18 | 29 | 14 |
| 30 | 3 | 17 | 29 | 15 |
| 31 | 3 | 17 | 29 | 15 | wherein each offset in non-integer part of the subpixel offset column is defined in 1/32 subpixel resolution.

8. The video data coding device of claim 5, wherein the coefficients, $c_0$, $c_1$, $c_2$, and $c_3$, of the interpolation filter depend on a non-integer part of the subpixel offset as follows:

| Non-integer part of the subpixel offset | $c_0$ | $c_1$ | $c_2$ | $c_3$ |
| --- | --- | --- | --- | --- |
| 0 (integer) | 16 | 32 | 16 | 0 |
| 1 | 15 | 29 | 17 | 3 |
| 2 | 15 | 29 | 17 | 3 |
| 3 | 14 | 29 | 18 | 3 |

-continued

| Non-integer part of the subpixel offset | $c_0$ | $c_1$ | $c_2$ | $c_3$ |
|---|---|---|---|---|
| 4 | 13 | 29 | 18 | 4 |
| 5 | 13 | 28 | 19 | 4 |
| 6 | 13 | 28 | 19 | 4 |
| 7 | 12 | 28 | 20 | 4 |
| 8 | 11 | 28 | 20 | 5 |
| 9 | 11 | 27 | 21 | 5 |
| 10 | 10 | 27 | 22 | 5 |
| 11 | 9 | 27 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 8 | 24 | 24 | 8 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 27 | 9 |
| 22 | 5 | 22 | 27 | 10 |
| 23 | 5 | 21 | 27 | 11 |
| 24 | 5 | 20 | 28 | 11 |
| 25 | 4 | 20 | 28 | 12 |
| 26 | 4 | 19 | 28 | 13 |
| 27 | 4 | 19 | 28 | 13 |
| 28 | 4 | 18 | 29 | 13 |
| 29 | 3 | 18 | 29 | 14 |
| 30 | 3 | 17 | 29 | 15 |
| 31 | 3 | 17 | 29 | 15 | wherein each offset in non-integer part of the subpixel offset column is defined in 1/32 subpixel resolution.

9. The video data coding device of claim 1, wherein the interpolation filter used in the intra-prediction process is a 4 tap filter.

10. The video data coding device of claim 9, wherein coefficients, $c_0$, $c_1$, $c_2$, and $c_3$, of the interpolation filter depend on a non-integer part of the subpixel offset as follows:

| Non-integer part of the subpixel offset | $c_0$ | $c_1$ | $c_2$ | $c_3$ |
|---|---|---|---|---|
| 0 (integer) | 16 | 32 | 16 | 0 |
| 1 | 15 | 29 | 17 | 3 |
| 2 | 14 | 29 | 18 | 3 |
| 3 | 14 | 29 | 18 | 3 |
| 4 | 14 | 28 | 18 | 4 |
| 5 | 13 | 28 | 19 | 4 |
| 6 | 12 | 28 | 20 | 4 |
| 7 | 12 | 27 | 20 | 5 |
| 8 | 11 | 27 | 21 | 5 |
| 9 | 11 | 27 | 21 | 5 |
| 10 | 10 | 26 | 22 | 6 |
| 11 | 10 | 26 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 7 | 25 | 25 | 7 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 26 | 10 |
| 22 | 6 | 22 | 26 | 10 |
| 23 | 5 | 21 | 27 | 11 |
| 24 | 5 | 21 | 27 | 11 |
| 25 | 5 | 20 | 27 | 12 |
| 26 | 4 | 20 | 28 | 12 |
| 27 | 4 | 19 | 28 | 13 |
| 28 | 4 | 18 | 28 | 14 |
| 29 | 3 | 18 | 29 | 14 |
| 30 | 3 | 18 | 29 | 14 |
| 31 | 3 | 17 | 29 | 15 | wherein each offset in non-integer part of the subpixel offset column is defined in 1/32 subpixel resolution.

11. The video data coding device of claim 1, wherein the interpolation filter is selected from a set of filters used for the intra-prediction process for a given subpixel offset.

12. The video data coding device of claim 11, wherein the set of filters comprises a Gauss filter and a Cubic filter.

13. The video data coding device of claim 1, wherein quantity of the interpolation filter is N, wherein the N interpolation filters are used for intra reference sample interpolation, and wherein N>=1 and N is a positive integer.

14. The video data coding device of claim 1, wherein reference samples include samples not adjacent to the block.

15. An intra-prediction device for predicting a current block included in a picture, the apparatus comprising:
a memory containing instructions; and
a processor in communication with the memory and upon execution of the instructions, is configured to:
determine a size of a main reference side used in intra-prediction based on:
an intra-prediction mode that provides, among available intra-prediction modes, a greatest non-integer value of a subpixel offset between a target sample among target samples in the current block and a reference sample used for predicting the target sample in the current block, the reference sample being a reference sample among reference samples included in the main reference side, and
a size of an interpolation filter to be applied on the reference samples included in the main reference side;
apply an interpolation filter on the reference samples included in the main reference side to obtain filtered reference samples; and
predict the target samples included in the current block based on the filtered reference samples,
wherein the size of the main reference side is determined as a sum of:
an integer part of the greatest non-integer value of the subpixel offset,
a size of a side of the current block, and
a half of the length of the interpolation filter.

16. The intra-prediction device of claim 15, wherein
the side of the current block is a width of the current block if the intra prediction mode is greater than a vertical intra prediction mode, VER_IDX;
or
the side of the current block is a height of the current block if the intra prediction mode is lesser than a horizontal intra prediction mode, HOR_IDX.

17. The intra-prediction device of claim 15, wherein values of reference samples having positions in the main reference side that are greater than double the size of the side of the current block are set to be equal to a value of a sample having a sample position that doubles the size of the current block.

18. The intra-prediction device of claim 15, wherein padding is performed by replicating a value of first reference sample and/or a value of last reference sample of the main reference side to a value of left and/or to a value of right of the main reference side respectively, in particular as follows: denoting the main reference side as ref, and the size of the main reference side as refS, the padding is represented as:

ref[−1]=p[0], and/or ref[refS+1]=p[refS], wherein ref[−1] represents the value of the left of the main reference side, p[0] represents the value of the first reference sample of the main reference side, ref[refS+1] represents the value of the right of the main reference side, and p[refS] represents the value of the last reference sample of the main reference side.

19. A method of video data coding, the method comprising:

Performing, by a video data coding device, an intra-prediction process of a block comprising samples to be predicted, wherein an interpolation filter is applied to reference samples of the block during the intra-prediction process of the block, wherein the interpolation filter is selected based on a subpixel offset between the reference samples and the samples to be predicted, wherein a size of a main reference side used in the intra-prediction process is determined according to a length of the interpolation filter and an intra-prediction mode that provides, out of a set of available intra-prediction modes, a greatest non-integer value of the subpixel offset, and wherein the main reference side comprises the reference samples, and wherein the size of the main reference side is determined as a sum of:

an integer part of the greatest non-integer value of the subpixel offset, a size of a side of the current block, and a half of the length of the interpolation filter.

20. A non-transitory computer-readable medium storing computer instructions for performing intra prediction, that when executed by one or more processors, cause the one or more processors to perform the steps of:

performing an intra-prediction process of a block comprising samples to be predicted, wherein an interpolation filter is applied to reference samples of the block during the intra-prediction process of the block, wherein the interpolation filter is selected based on of a subpixel offset between the reference samples and the samples to be predicted, wherein a size of a main reference side used in the intra-prediction process is determined according to a length of the interpolation filter and an intra-prediction mode that provides, out of a set of available intra-prediction modes, a greatest non-integer value of the subpixel offset, and wherein the main reference side comprises the reference samples, wherein the size of the main reference side is determined as a sum of:

an integer part of the greatest non-integer value of the subpixel offset, a size of a side of the current block, and a half of the length of the interpolation filter.

* * * * *